United States Patent
Matsumoto et al.

(10) Patent No.: US 11,204,753 B2
(45) Date of Patent: Dec. 21, 2021

(54) INFORMATION DISTRIBUTION SYSTEM AND IN-VEHICLE DEVICE

(71) Applicant: CLARION CO., LTD., Saitama (JP)

(72) Inventors: Takashi Matsumoto, Tokyo (JP); Tsuyoshi Hano, Saitama (JP); Yasushi Nagai, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/629,941

(22) PCT Filed: May 25, 2018

(86) PCT No.: PCT/JP2018/020247
§ 371 (c)(1),
(2) Date: Jan. 9, 2020

(87) PCT Pub. No.: WO2019/012821
PCT Pub. Date: Jan. 17, 2019

(65) Prior Publication Data
US 2020/0233654 A1 Jul. 23, 2020

(30) Foreign Application Priority Data
Jul. 12, 2017 (JP) .............................. JP2017-136675

(51) Int. Cl.
*G06F 9/445* (2018.01)
*G06F 8/65* (2018.01)
(Continued)

(52) U.S. Cl.
CPC ............ *G06F 8/65* (2013.01); *G06F 9/44505* (2013.01); *H04L 67/34* (2013.01); *H04W 4/44* (2018.02)

(58) Field of Classification Search
CPC ........ G06F 8/65; G06F 9/44505; H04W 4/44; H04L 67/34
(Continued)

(56) References Cited

U.S. PATENT DOCUMENTS

2015/0195266 A1 7/2015 Endo et al.
2015/0227359 A1 8/2015 Todoroki et al.
(Continued)

FOREIGN PATENT DOCUMENTS

JP 2007-65856 A 3/2007
JP 2013-250640 A 12/2013
(Continued)

OTHER PUBLICATIONS

International Search Report and Written Opinion of corresponding PCT/JP2018/020247, dated Jun. 19, 2018, 6 pages.
(Continued)

*Primary Examiner* — Chuck O Kendall
(74) *Attorney, Agent, or Firm* — Lewis Roca Rothgerber Christie LLP

(57) ABSTRACT

A server which communicates with an in-vehicle terminal, a communication terminal, or a vehicle communication device, upon receiving at least one of either configuration information of in-vehicle terminal software or configuration information of vehicle software from any information source among the in-vehicle terminal, the communication terminal, or the vehicle communication device, generates, based on the received information and identification information for identifying the communication path used by the information source, at least one among software to be distributed for distributing the information source as a communication target and which includes update information of the vehicle software or update information of the in-vehicle terminal software, a list of vehicle software to be updated or a list of
(Continued)

in-vehicle terminal software to be updated as information which was excluded from the software to be distributed, and sends at least one among the generated software to be distributed, the list of vehicle software to be updated, or the list of in-vehicle terminal software to be updated to the information source.

15 Claims, 26 Drawing Sheets

(51) Int. Cl.
*H04W 4/44* (2018.01)
*H04L 29/08* (2006.01)

(58) Field of Classification Search
USPC .................................................. 717/168–178
See application file for complete search history.

(56) References Cited

U.S. PATENT DOCUMENTS

| | | | |
|---|---|---|---|
| 2015/0347121 A1* | 12/2015 | Harumoto | H04L 67/2871 717/172 |
| 2016/0202966 A1 | 7/2016 | Vangelov | |
| 2017/0123782 A1 | 5/2017 | Choi | |
| 2018/0024826 A1* | 1/2018 | Caushi | G06F 8/65 717/172 |

FOREIGN PATENT DOCUMENTS

| | | |
|---|---|---|
| JP | 2014-41456 A | 3/2014 |
| JP | 2016-60407 A | 4/2016 |

OTHER PUBLICATIONS

Extended European Search Report dated Mar. 26, 2021 regarding European Patent Application No. 18832353.9 corresponding to U.S. Appl. No. 16/629,941 (9 pages).

* cited by examiner

INFORMATION DISTRIBUTION SYSTEM AND IN-VEHICLE DEVICE

CROSS-REFERENCE TO RELATED APPLICATION(S)

This application is a U.S. National Phase Patent Application and claims priority to and the benefit of International Application Number PCT/JP2018/020247, filed on May 25, 2018, which claims priority of Japanese Patent Application Number 2017-136675, filed on Jul. 12, 2017, the entire contents of all of which are incorporated herein by reference.

TECHNICAL FIELD

The present invention relates to an information distribution system and an in-vehicle device for updating software, such as car navigation, used in vehicles.

BACKGROUND ART

The main objective of car navigation is to comprehend the current position of a vehicle based on information from sensors of a GPS (Global Positioning System) or the like and displaying the route to the destination on a map, and offering route guidance to the destination based on the current position of the vehicle. It is anticipated that the ratio of car navigation having a communication function will increase in the future in order to be compliant with connected cards and due to the popularization of automatic driving vehicles. Connected cars and automatic driving vehicles are required to update software in a timely manner for updating security measures and expanding services/automatic driving functions and adding new functions.

As the technology for resolving the foregoing problems, there is the technology described in PTL 1. With the technology described in PTL 1, provided is a notification means which receives correction software for correcting software from a server installed outside the vehicle, performs determination based on the operational status of the vehicle, and notifies information related to the rewriting of software to the user's communication terminal based on the determination result. It is thereby possible to efficiently rewrite the vehicle control software, which is provided from a server or the like installed at a remote location, in the vehicle.

Moreover, with the technology described in PTL 2, in a system where an in-vehicle terminal of car navigation and a communication terminal such as a smartphone coordinate with each other, provided is a means for coordinating the update of software of both the in-vehicle terminal and the mobile terminate in order to maintain their compatibility. In the future, it is anticipated that the vehicle software update described in PTL 1 will be provided in the system described in PTL 2 in which the in-vehicle terminal and the communication terminal coordinate with each other.

CITATION LIST

Patent Literature

[PTL 1] Japanese Patent Application Publication No. 2007-65856

[PTL 2] Japanese Patent Application Publication No. 2014-41456

SUMMARY OF THE INVENTION

Problems to be Solved by the Invention

Generally speaking, vehicle software is mainly for use in controllers, and the size of the software is small. As the communication path to be used for updating the vehicle software, a dedicated communication path of the vehicle is used to prevent failure of the software update and intervention of a malicious attacker. Because the communication path is dedicated for vehicle use, there is a problem in that the communication cost becomes expensive and large-capacity communication is not possible.

Meanwhile, because software of an in-vehicle terminal includes information of navigation maps and GUI (Graphical User Interface), the size of the software is large. Since the communication terminal that is normally used by the user is used as the communication path to be used for updating the in-vehicle terminal, large-capacity communication is possible. However, because the communication terminal is configured to mediate the server and the vehicle/in-vehicle terminal, there is a problem in that the intervention of a malicious attacker becomes easier in comparison the communication path that is used for updating the vehicle software, and is inferior in terms of security.

The present invention was devised to resolve the foregoing problems, and an object of this invention is to properly select, in a system for updating the software of the vehicle and the in-vehicle terminal, a communication path having different restrictions depending on the software to be updated.

Means to Solve the Problems

In order to achieve the foregoing object, the present invention sends, from the in-vehicle terminal to the server, configuration information of the in-vehicle terminal software, configuration information of the vehicle software, and information for identifying the communication path to be used in the software update, and the server determines the software to be distributed based on the received information.

Advantageous Effects of the Invention

According to the present invention, in a system for updating the software of the vehicle and the in-vehicle terminal, it is possible to properly select a communication path having different restrictions depending on the software to be updated.

DESCRIPTION OF EMBODIMENTS

First Embodiment

The first embodiment of the present invention is now explained with reference to FIG. 1 to FIG. 12.

Figure 1:
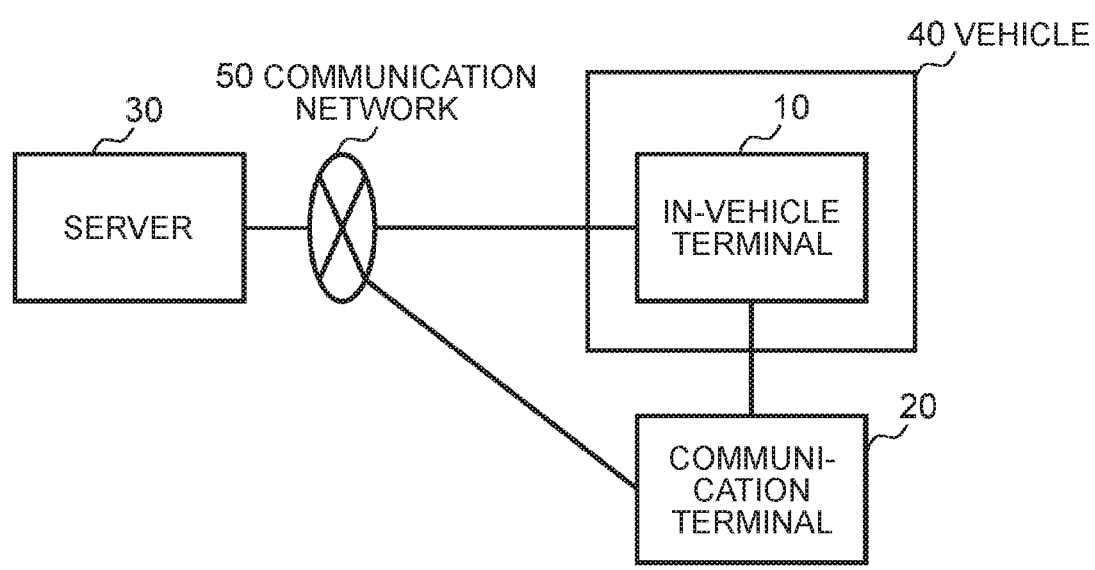
FIG. 1 is an overall configuration diagram of the information distribution system.

FIG. 1 is a configuration example of the information distribution system to which the present invention is applied. The information distribution system is a system which provides a software update of the vehicle and the in-vehicle terminal, and is configured from an in-vehicle terminal 10, a communication terminal 20, a server 30, a vehicle 40 and a communication network 50.

The in-vehicle terminal 10 is connected to the server 30 via the communication network 50, and receives or sends information required for providing the software update. The in-vehicle terminal 10 may be independently connected to the communication network 50 via a wireless LAN (Local Area Network) access point installed outside the vehicle or by using a vehicle communication device (not shown) equipped in the vehicle 40, or may be connected to the communication network 50 via the communication terminal 20.

The communication terminal 20 is connected to the server 30 via the communication network 50, and receives or sends information required for the software update.

The in-vehicle terminal 10 and the communication terminal 20 are connected using a communication function that can be used for connecting terminals such as a USB (Universal Serial Bus), Bluetooth (registered trademark), or wireless LAN. Moreover, the in-vehicle terminal 10 and the communication terminal 20 may be respectively connected to the communication network 50, and may send and receive information indirectly via the server 30.

The server 30 is connected to the in-vehicle terminal 10, the communication terminal 20 and the vehicle 40 via the communication network 50, and sends and receives information.

The vehicle 40 is connected to the in-vehicle terminal 10, and receives or sends information required for providing the software update. Moreover, the vehicle 40 is connected to the communication network 50 by using the vehicle communication device equipped in the vehicle 40.

The communication network 50 is a network such as a telephone network or an internet network which enables interconnection between computers and terminals.

Figure 2:
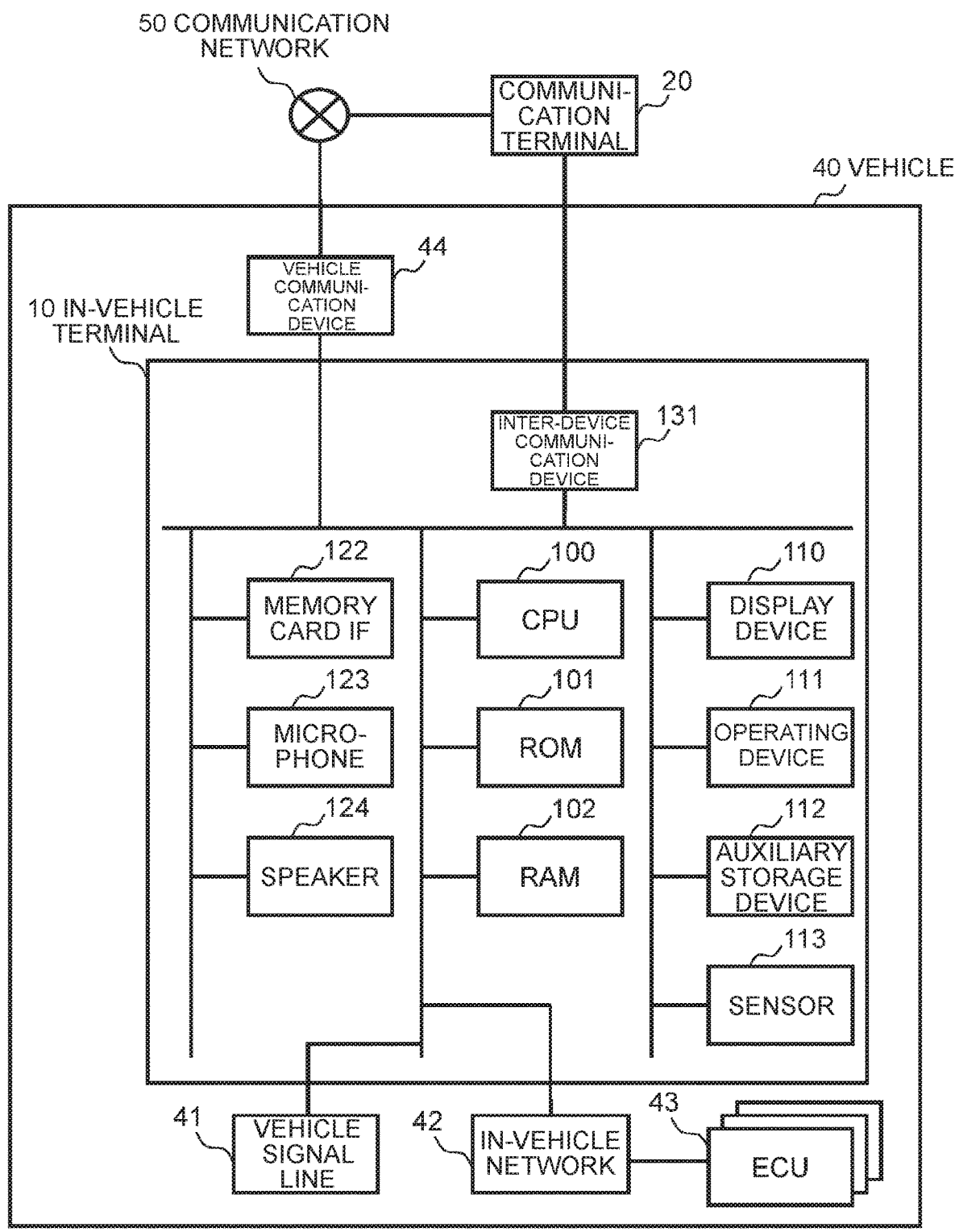
FIG. 2 is a hardware configuration diagram of the in-vehicle terminal and the vehicle.

FIG. 2 is a hardware configuration example of the in-vehicle terminal and the vehicle configuring the present invention.

The in-vehicle terminal 10 is configured, as hardware, from a CPU 100, a ROM (Read Only Memory) 101, a RAM (Random Access Memory) 102, a display device 110, an operating device 111, an auxiliary storage device 112, a sensor 113, a memory card IF (Interface) 122, a microphone 123, a speaker 124 and an inter-device communication device 131.

The CPU 100 is a device which controls the respective parts of the in-vehicle terminal 10, and executes software such as the car navigation or the software update loaded in the RAM 102.

The ROM 101 is a read-only storage device in which control software is written therein.

The RAM 102 is a device for reading software stored in the auxiliary storage device 112 and temporarily storing the software, and storing the work data which is generated when the CPU 100 executes the software.

The display device 110 is a device such as a liquid crystal display or an organic EL (Electro-Luminescence) display for displaying image information to the user.

The operating device 111 is a device such as a button, switch, keyboard or touch panel to be used by the user for operating the in-vehicle terminal 10 with one's finger.

The auxiliary storage device 112 is a large-capacity storage device for storing various data such as map data and configuration files to be used by software such as car navigation, and is configured, for instance, from an HDD (Hard Disk Drive) or an SSD (Solid State Drive). When the information becomes old and needs to be replaced, the in-vehicle terminal 10 can acquire and update, via the communication network 50, various data stored in the auxiliary storage device 112 from the server 30 connected to the communication network 50.

The sensor 113 provides information for locating one's own position indicated with the global latitude and longitude such as a GPS, and information for measuring the angle and angular velocity of the vehicle 40.

The memory card IF 122 is an interface for reading and writing information from and into a memory card such as an SD memory card (registered trademark).

The microphone 123 is a device for collecting the user's voice and is used for voice recognition.

The speaker 124 is a device for outputting a voice guidance and an operating sound during routing assistance, and music information to be reproduced.

The inter-device communication device 131 is an interface device for exchanging data by being connected to the communication terminal 20. The connection mode may be a wire-line connection in accordance with a standard such as USB or HDMI (registered trademark) (High-Definition Multimedia Interface), or a wireless connection in accordance with a standard such as IEEE 802.11a/b/g/n of a wireless LAN or Bluetooth (registered trademark).

The in-vehicle terminal 10 is connected to the vehicle 40 via a vehicle signal line 41 and an in-vehicle network 42, and acquires information representing the internal state of the vehicle 40 such as the speed of the vehicle 40, steering angle of the steering wheel, position of the shift lever and state of the parking brake. Moreover, the vehicle communication device 44 is a device which executes data communication with the server 30 via the communication network 50 such as a TCU (Telematics Control Unit), and can also be used from the in-vehicle terminal 10.

The ECU (Electronic Control Unit) 43 is the collective designation of the devices inside the vehicle 40 and the devices for controlling the vehicle 40 of the system (engine, brake, steering wheel, meter, obstacle detection sensor, etc.), and a plurality of ECUs 43 are mounted within the vehicle 40.

Figure 3:
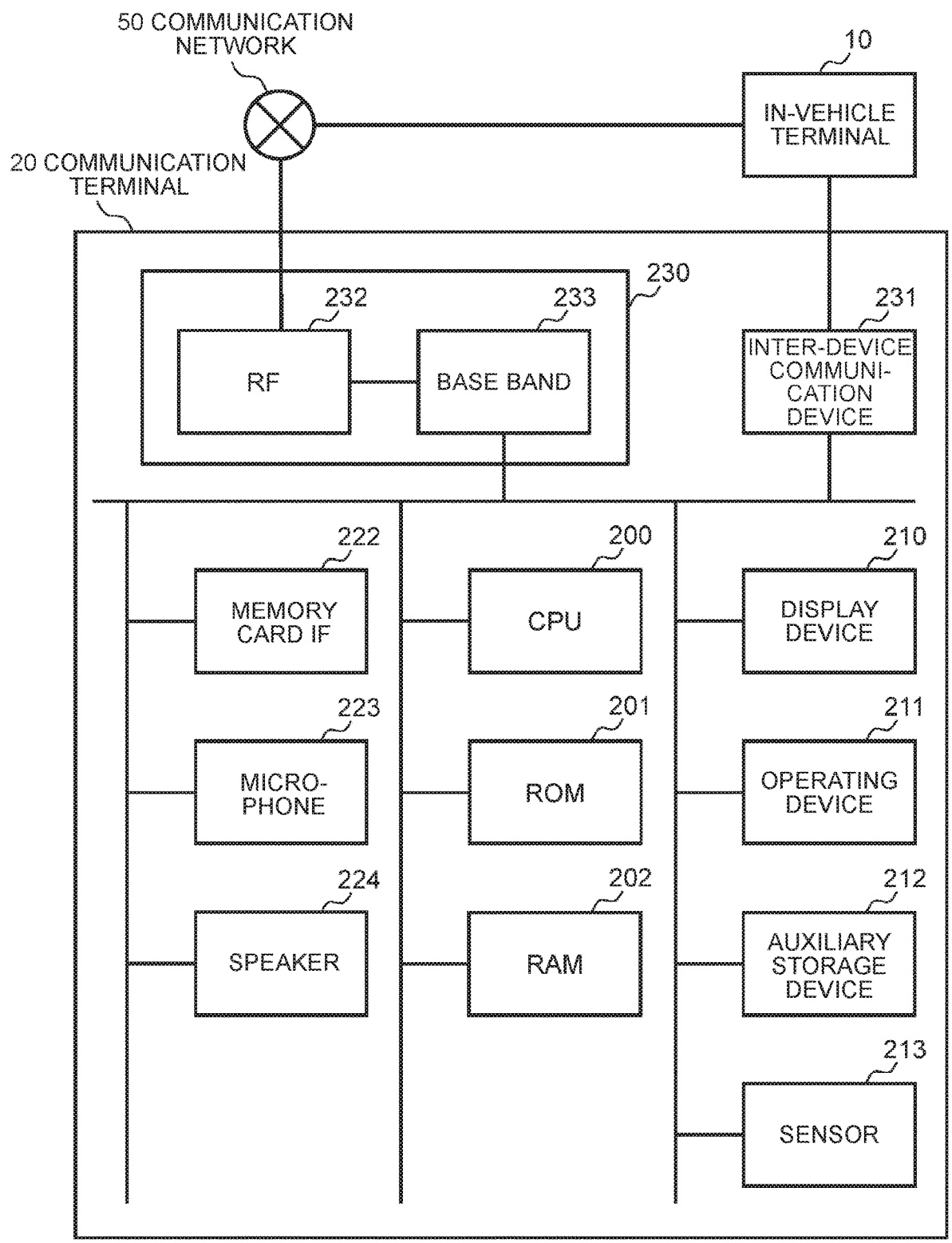
FIG. 3 is a hardware configuration diagram of the communication terminal.

FIG. 3 is a hardware configuration example of the communication terminal configuring the present invention.

The communication terminal 20 is configured, as hardware, from a CPU 200, a ROM (Read Only Memory) 201, a RAM (Random Access Memory) 202, a display device 210, an operating device 211, an auxiliary storage device 212, a sensor 213, a memory card IF (Interface) 222, a microphone 223, a speaker 224, a communication device 230 and an inter-device communication device 231.

The CPU 200 is a device which controls the respective parts of the communication terminal 20, and executes software loaded in the RAM 202.

The ROM 201 is a read-only storage device in which control software is written therein.

The RAM 202 is a device for reading programs stored in the auxiliary storage device 212 and temporarily storing the programs, and storing the work data which is generated when the CPU 200 executes the programs.

The display device 210 is a device such as a liquid crystal display or an organic EL (Electro-Luminescence) display for displaying image information to the user.

The operating device 211 is a device such as a button, switch, keyboard or touch panel to be used by the user for operating the communication terminal 20 with one's finger.

The auxiliary storage device 212 is a large-capacity storage device for storing various data such as information and configuration files to be used by software, and is configured, for instance, from an SSD (Solid State Drive).

The sensor 213 provides information for locating one's own position indicated with the global latitude and longitude such as a GPS, and information for measuring the inclination of the communication terminal 20.

The memory card IF 222 is an interface for reading and writing information from and into a memory card such as an SD memory card (registered trademark).

The microphone 223 is a device for collecting the user's voice and is used for voice recognition.

The speaker 224 is a device for outputting a voice guidance and an operating sound during routing assistance, and music information to be reproduced.

The communication device 230 is a device for executing data communication with the server 30 via the communication network 50 based on a function such as an antenna (not shown), an RF (Radio Frequency) 232, or a base band 233.

The inter-device communication device 231 is an interface device for exchanging data by being connected to the in-vehicle terminal 10. The connection mode may be a wire-line connection in accordance with a standard such as USB or HDMI (registered trademark) (High-Definition Multimedia Interface), or a wireless connection in accordance with a standard such as IEEE 802.11a/b/g/n of a wireless LAN or Bluetooth (registered trademark).

The configuration for providing the software update in the in-vehicle terminal 10 and the vehicle 40 is now explained with reference to FIG. 4.

The in-vehicle terminal 10 is configured by comprising, as software resources (programs) to be executed by the CPU 100, a software updating unit 400, an in-vehicle terminal software (soft) installation unit 440, in-vehicle terminal software (soft) 442, a software (soft) storage unit 444 and a communication unit 450. The communication unit 450 is connected to the inter-device communication device 131.

Moreover, the software updating unit 400 is configured from a software (soft) update control unit 410, an in-vehicle terminal software (soft) configuration management unit 420, and a communication path identification unit 430.

The vehicle 40 is configured by comprising, as software resources (programs), a vehicle communication unit 460, a vehicle software (soft) update control unit 470, a vehicle software (soft) configuration management unit 480, a vehicle software (soft) installation unit 490, a vehicle software (soft) storage unit 494, and vehicle software (soft) 492 respectively executed in the plurality of ECUs 43 equipped in the vehicle 40. The vehicle communication unit 460 is connected to the vehicle communication device 44. Moreover, the vehicle control device and the in-vehicle terminal 10 are devices connected via the in-vehicle network 42 which send and receive information via the in-vehicle network 42 and operate by coordinating with each other, and are configured as an in-vehicle device mounted on the vehicle 40.

The software updating unit 400 is a functional group for executing the software update of the in-vehicle terminal 10 and the vehicle 40. The software update control unit 410, in order to execute the software update, is connected to an in-vehicle terminal software configuration management unit 420, a communication path identification unit 430, an in-vehicle terminal software installation unit 440, an in-vehicle terminal software 442, a software storage unit 444 and a communication unit 450.

The in-vehicle terminal software configuration management unit 420 generates information (such as configuration information) required for updating the in-vehicle terminal software such as the software installed in the in-vehicle terminal and its version as well as the hardware configuration and model number of the in-vehicle terminal 10.

The communication path identification unit 430 identifies the communication path to be used by the communication unit 450 for the software updating unit 400 to connect to the server 30 upon performing software update processing. While three types of communication paths are explained in this embodiment; namely, the communication terminal 20, the access point installed outside the vehicle or the wireless LAN using the tethering function of the communication terminal 20, and the vehicle communication device 44, the present invention is not limited thereto, and other communication paths may be used.

The in-vehicle terminal software installation unit 440 executes the installation of the update software acquired from the server 30.

The in-vehicle terminal software 442 is software installed in the in-vehicle terminal 10. The software storage unit 444 stores information used in the software update acquired from the server 30.

The vehicle software update control unit 470 uses the vehicle communication unit 460 to connect to the server 30 and acquires the vehicle update software, and coordinates with the software update control unit 410 to provide the vehicle software update via the in-vehicle terminal 10.

The vehicle software configuration management unit 480 generates configuration information required for updating the vehicle software such as the software installed in the vehicle and its version as well as the hardware configuration and model number of the vehicle 40.

The vehicle software installation unit 490 executes the installation of the vehicle update software acquired from the server 30.

The vehicle software 492 is software installed in the vehicle 40, and includes control software to be executed by the ECU 43.

The vehicle software storage unit 494 stores information to be used in the software update acquired from the server 30. The vehicle software (soft) update control unit 470, the vehicle software (soft) configuration management unit 480, the vehicle software (soft) installation unit 490 and the vehicle software (soft) storage unit 494 may be executed by being equipped in the ECU 43 dedicated to updating the vehicle software, or may be executed with the vehicle communication device 44 or another device equipped in the vehicle 40.

Figure 5:
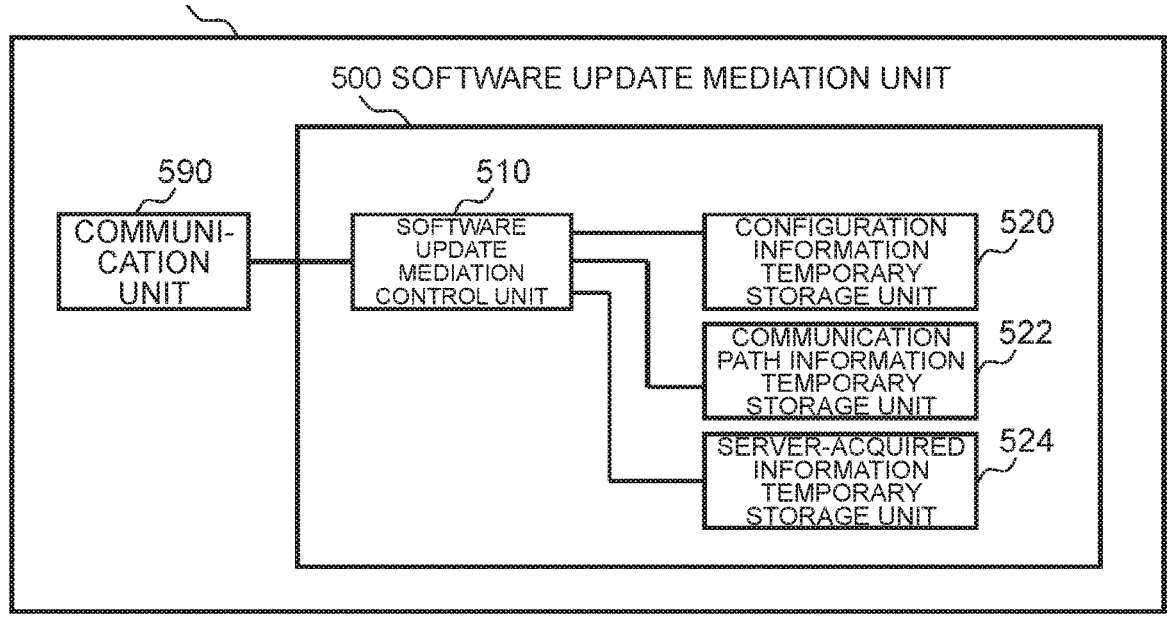
FIG. 5 is a configuration diagram of the software update function in the communication terminal.

The configuration of providing the software update in the communication terminal 20 is now explained with reference to FIG. 5.

The communication terminal 20 is configured from a software update mediation unit 500 and a communication unit 590. The software update mediation unit 500 provides a function of mediating the in-vehicle terminal 10 and the server 30 for providing a software update in the communication terminal 20, and is configured from a software update mediation control unit 510, a configuration information temporary storage unit 520, a communication path information temporary storage unit 522, and a server-acquired information temporary storage unit 524.

The software update mediation control unit 510 provides a function of communicating with the in-vehicle terminal 10 and the server 30, and mediating (relaying) the software update. The configuration information temporary storage unit 520 temporarily stores the configuration information of software received from the in-vehicle terminal 10. The communication path information temporary storage unit 522 temporarily stores the information (communication path information) for identifying the communication path received from the in-vehicle terminal 10. The server-acquired information temporary storage unit 524 temporarily stores the information acquired from the server 30.

The configuration of providing the software update in the server 30 is now explained with reference to FIG. 6.

The server 30 is a computer device comprising a CPU, a communication device and the like (none are shown), and is configured by comprising, as software resources (programs) to be executed by the CPU, a software distribution unit 600, an in-vehicle terminal software management unit 630, an in-vehicle terminal software database 632, a vehicle software management unit 640, a vehicle software database 642, and a communication unit 690.

The software distribution unit 600 provides a function of communicating with the in-vehicle terminal 10, the communication terminal 20 and the vehicle 40 (vehicle communication device 44) and distributing software, and is configured from a software distribution control unit 610 and a communication path determination unit 620.

The software distribution control unit 610 determines the software to be distributed based on the configuration information of software and the communication path (communication path information) acquired from the in-vehicle terminal 10, the communication terminal 20 and the vehicle 40 (vehicle communication device 44). The communication path determination unit 620 determines the communication path that is being used for the software update based on the communication path information acquired from the in-vehicle terminal 10, the communication terminal 20, and the vehicle 40 (vehicle communication device 44). The in-vehicle terminal software management unit 630 determines the in-vehicle terminal software to be distributed based on the software configuration information of the in-vehicle terminal acquired from the in-vehicle terminal 10 or the communication terminal 20 and creates a list thereof, and acquires the list of software (update information of in-vehicle terminal software and list of in-vehicle terminal software to be updated) from the in-vehicle terminal software database 632 and provides the acquired list to the software distribution control unit 610. The vehicle software management unit 640 determines the vehicle software to be distributed based on the configuration information of the vehicle software acquired from the in-vehicle terminal 10, the communication terminal 20 or the vehicle 40 (vehicle communication device 44) and creates a list thereof, and acquires the list of software (update information of vehicle software and list of vehicle software to be updated) from the vehicle software database 642 and provides the acquired list to the software distribution control unit 610.

Specifically, the server 30 has a function of, upon receiving at least one of either configuration information of the in-vehicle terminal software or configuration information of the vehicle software from any information source among the in-vehicle terminal 10, the communication terminal 20, or the vehicle communication device 44, generating, based on the received information and identification information for identifying the communication path of the software update used by the information source, at least one among software to be distributed for distributing the information source as a communication target and which includes update information of the vehicle software or update information of the in-vehicle terminal software, a list of vehicle software to be updated or a list of in-vehicle terminal software to be updated as information which was excluded from the software to be distributed, and sending at least one among the generated software to be distributed, the generated list of vehicle software to be updated, or the generated list of in-vehicle terminal software to be updated to the information source.

Here, when the communication path determination unit 620 determines that the communication path=the communication terminal 20 based on the identification information, the software distribution control unit 610 identifies the update information of the in-vehicle terminal software as the software to be distributed on the condition of having received configuration information of the in-vehicle terminal software and configuration information of the vehicle software via the communication terminal 20, identifies the update information of the vehicle software as software not to be distributed which cannot be distributed with the communication path=the communication terminal 20, generates update information of the in-vehicle terminal software, generates a list (chart) of vehicle software to be updated as information which was excluded from the software to be distributed, and distributes the generated update information of the in-vehicle terminal software and the generated list (chart) of vehicle software to be updated to the communication terminal 20.

Meanwhile, when the communication path determination unit 620 determines that the communication path=the communication terminal 20 based on the identification information, the software distribution control unit 610 identifies the update information of the in-vehicle terminal software as the software to be distributed on the condition of having received only the configuration of the in-vehicle terminal software via the communication terminal 20, identifies the update information of the vehicle software as software not to be distributed that cannot be distributed with the communication path=the communication terminal 20, generates update information of the in-vehicle terminal software, and distributes the generated update information of the in-vehicle terminal software to the communication terminal 20.

Moreover, when the communication path determination unit 620 determines that the communication path=the vehicle communication device 44 based on the identification information, the software distribution control unit 610 identifies the update information of the vehicle software as the software to be distribution on the condition of having received only the configuration information of the vehicle software via the vehicle communication device 44, identifies the update information of the in-vehicle terminal software as software not to be distributed that cannot be distributed with the communication path=the vehicle communication device 44, generates update information of the vehicle software, and distributes the generated update information of the vehicle software to the vehicle communication device 44.

Meanwhile, when the communication path determination unit 620 determines that the communication path=the vehicle communication device 44 based on the identification information, the software distribution control unit 610 identifies the update information of the vehicle software as the software to be distributed on the condition of having received configuration information of the in-vehicle terminal software and configuration information of the vehicle software via the vehicle communication device 44, identifies the update information of the in-vehicle terminal software as software not be distributed that cannot be distributed with the communication path=the vehicle communication device 44, generates update information of the vehicle software and generates a list (chart) of in-vehicle terminal software to be updated as information which was excluded from the software to be distributed, and distributes the generated update information of the vehicle software and the generated list (chart) of in-vehicle terminal software to be updated to the vehicle communication device 44.

Moreover, when the communication path determination unit 620 determines that the communication path=a wireless LAN based on the identification information, the software distribution control unit 610 identifies the update information of the in-vehicle terminal software as the software to be distributed on the condition of having received configuration information of the in-vehicle terminal software and configuration information of the vehicle software from the in-vehicle terminal 10 via the wireless LAN, identifies the update information of the vehicle software as software not to be distributed which cannot be distributed with the communication path=the wireless LAN, generates update information of the in-vehicle terminal software and a list (chart) of vehicle software to be updated as information which was excluded from the software to be distributed, and distributes the generated update information of the in-vehicle terminal software and the generated list (chart) of vehicle software to be updated to the in-vehicle terminal 10 via the wireless LAN.

Meanwhile, when the communication path determination unit 620 determines that the communication path=a wireless LAN based on the identification information, the software distribution control unit 610 identifies the update information of the vehicle software as the software to be distributed on the condition of having received only configuration information of the vehicle software from the in-vehicle terminal 10 via the wireless LAN, identifies the update information of the in-vehicle terminal software as software not to be distributed which cannot be distributed with the communication path=the wireless LAN, generates update information of the vehicle software, and distributes the generated update information of the vehicle software to the in-vehicle terminal 10 via the wireless LAN.

Figure 6:
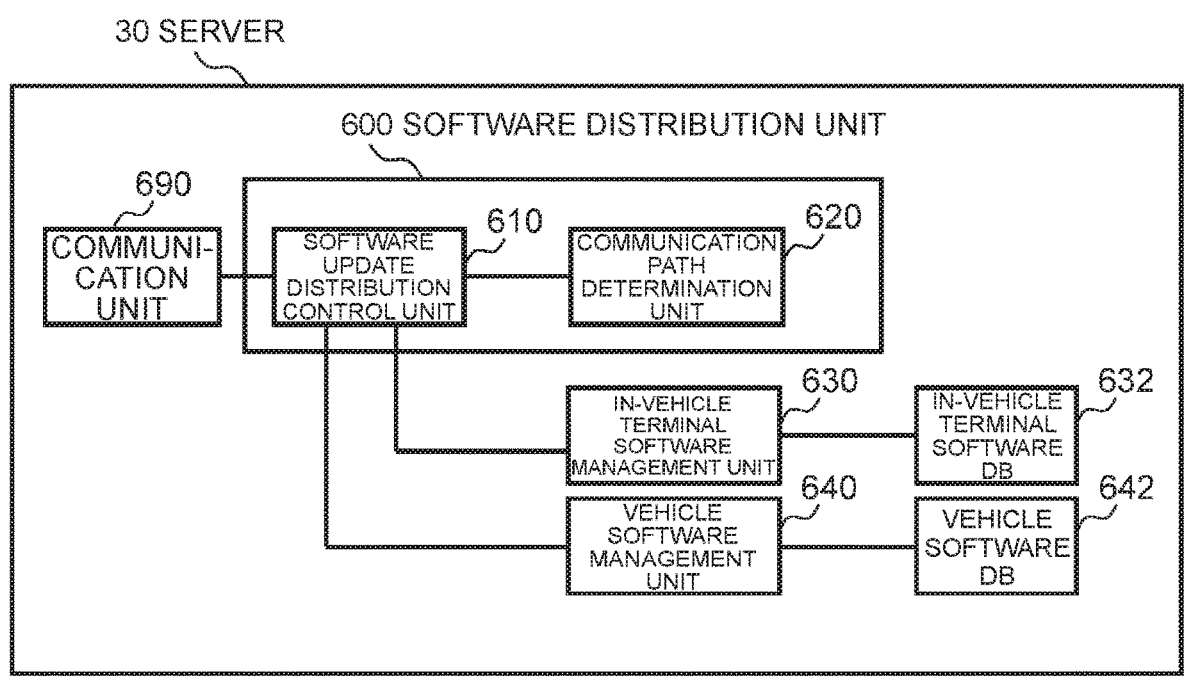
FIG. 6 is a configuration diagram of the software update function in the server.
Figure 7:
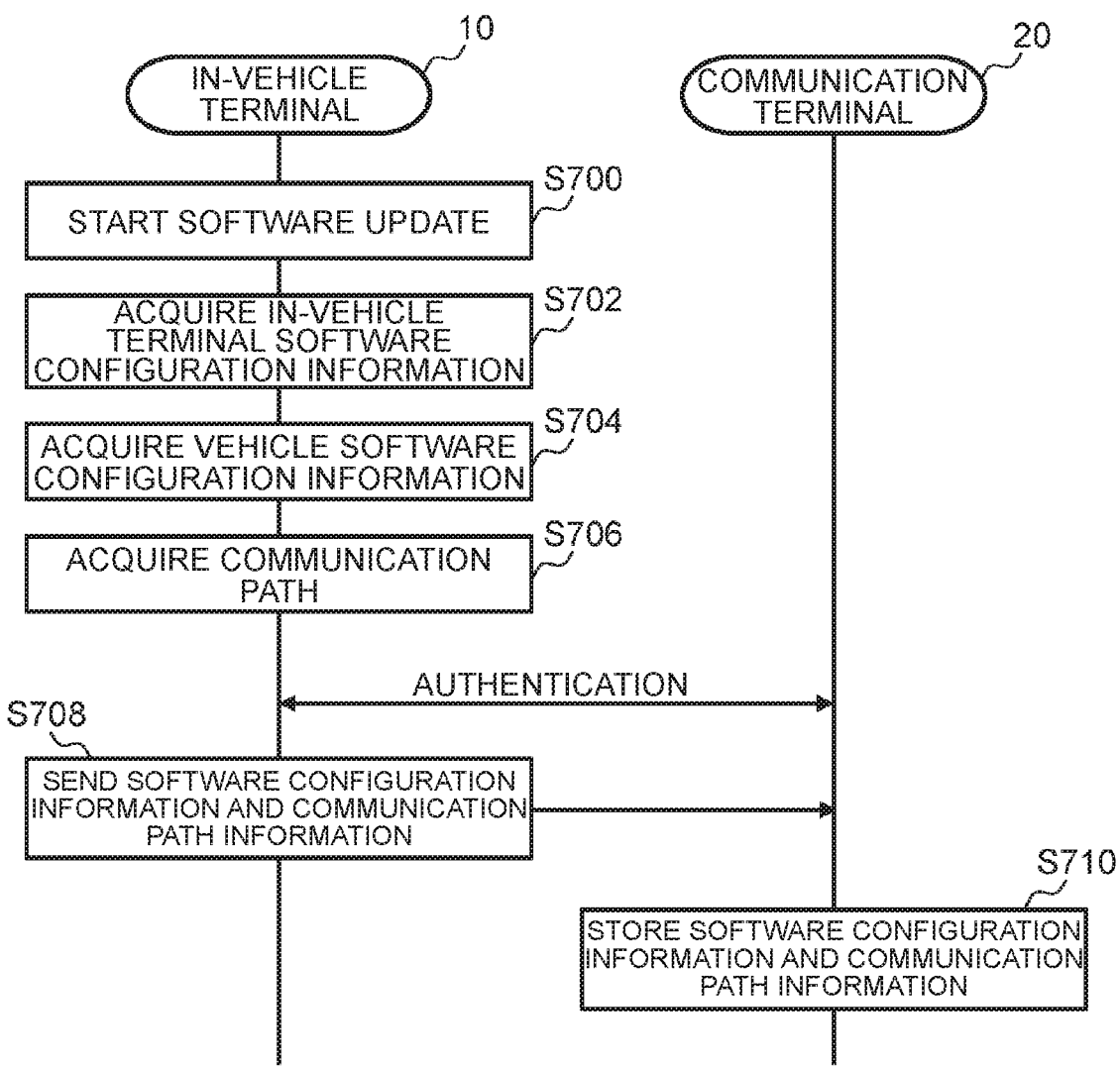
FIG. 7 is a flowchart showing the processing flow of the information distribution system in the first embodiment.
Figure 8:
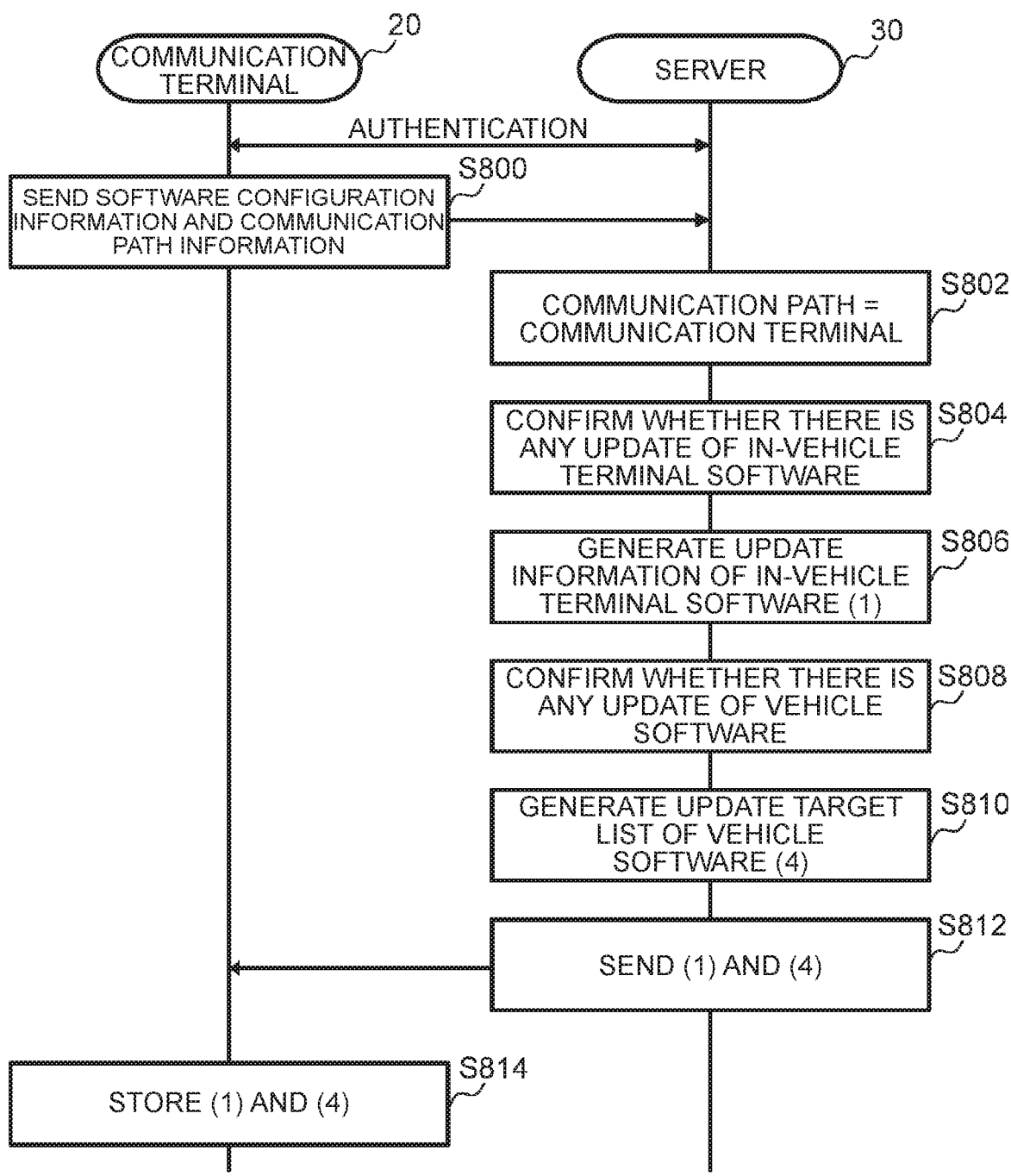
FIG. 8 is a flowchart showing the processing flow of the information distribution system in the first embodiment.
Figure 9:
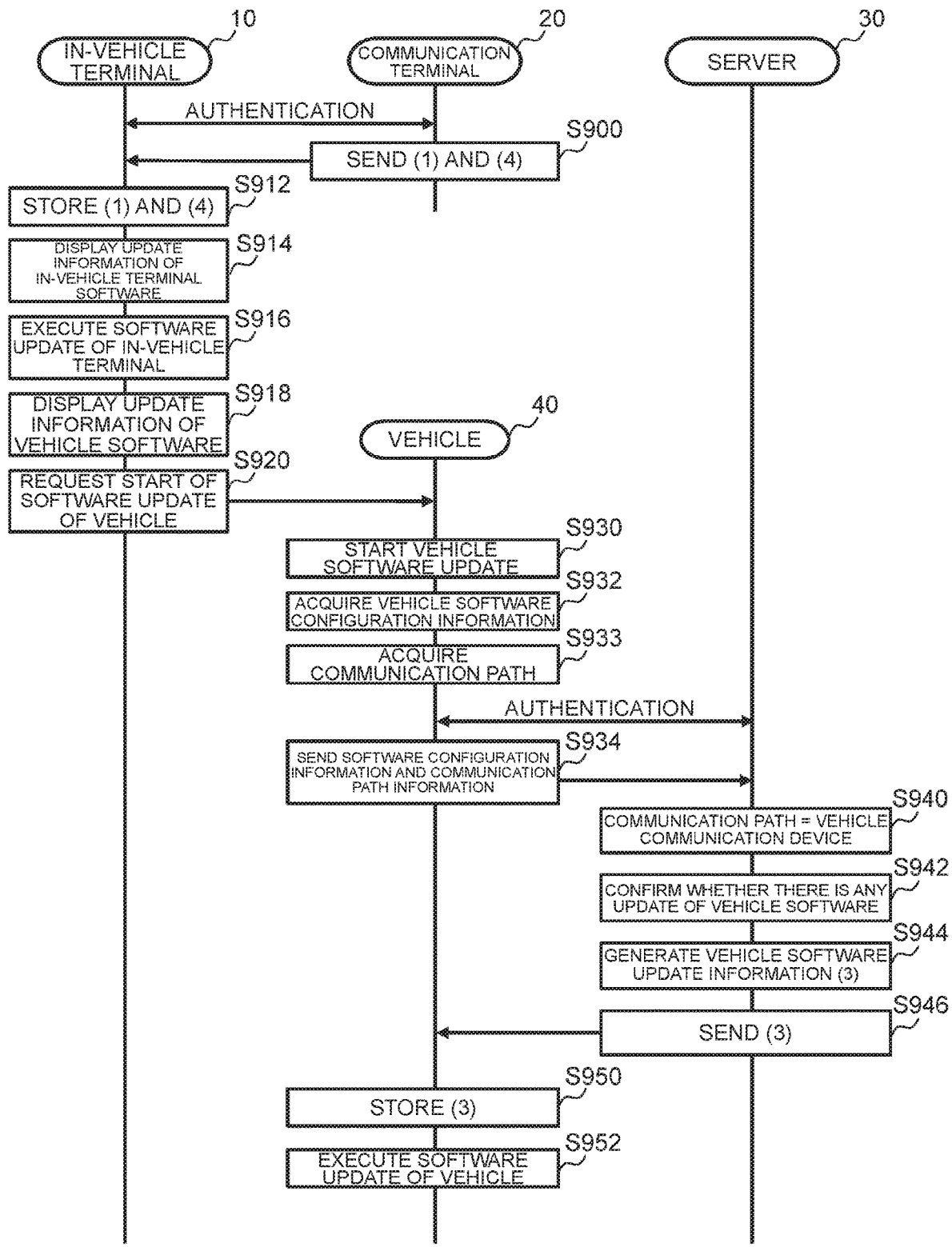
FIG. 9 is a flowchart showing the processing flow of the information distribution system in the first embodiment.

FIG. 7 to FIG. 9 show the processing flow for the in-vehicle terminal 10, the communication terminal 20 and the vehicle 40 to coordinate and provide the software update using the configuration illustrated in FIG. 1 to FIG. 6.

FIG. 7 shows the software update processing between the in-vehicle terminal 10 and the communication terminal 20. When the software update control unit 410 of the in-vehicle terminal 10 starts the software update (S700), the software update control unit 410 acquires configuration information of the in-vehicle terminal software from the in-vehicle terminal software configuration management unit 420 (S702). Next, the software update control unit 410 acquires configuration information of the vehicle software from the vehicle software configuration management unit 480 of the vehicle 40 (S704), and thereafter acquires the communication path (one among communication terminal 20, wireless LAN, and vehicle communication device 44) that can be used for the software update (S706). Here, for example, the software update control unit 410 sets the communication target (communication destination) of the communication unit 450 or the vehicle communication unit 460 as the communication path (one among communication terminal 20, wireless LAN, and vehicle communication device 44), and generates communication path information as the identification information for identifying the communication path. Note that, in this embodiment, there is no particular limitation in the method of determining the communication path that can used for the software update. Moreover, in FIG. 7 to FIG. 9, described is a case of using the communication terminal 20 as the communication path that can be used for the software update.

In order to send configuration information of the in-vehicle terminal software, configuration information of the vehicle software, and the communication path information to the server 30, the in-vehicle terminal 10 performs some kind of authentication with the communication terminal 20, and sends the configuration information of the in-vehicle terminal and the vehicle software, and the communication path information (communication path=communication terminal 20), to the communication terminal 20 (S708). When the software update mediation control unit 510 of the communication terminal 20 receives information from the in-vehicle terminal 10, the software update mediation control unit 510 stores such information in the configuration information temporary storage unit 520 and the communication path information temporary storage unit 522 (S710). In this embodiment, there is no particular limitation in the method of authentication between the in-vehicle terminal 10 and the communication terminal 20. Authentication may be performed based on known methods such as by using share information, by using a common key, or by using a public key.

FIG. 8 describes the processing of the communication terminal 20 sending, to the server 30, information to be used in the software update acquired from the in-vehicle terminal 10, and acquiring software. When some kind of authentication is performed between the communication terminal 20 and the server 30 and their connection is completed, the software update mediation control unit 510 sends the configuration information of the in-vehicle terminal and the vehicle software, and the communication path information, to the server 30 (S800). In this embodiment, there is no particular limitation in the method of authentication between the communication terminal 20 and the server 30. Authentication may be performed based on known methods such as by using share information, by using a common key, or by using a public key.

When the software distribution control unit 610 of the server 30 receives information from the communication terminal 20, the software distribution control unit 610 identifies the communication path that is being used for the software update as the communication terminal 20 based on the communication path information (communication path=communication terminal 20) among the received information (S802).

When the communication path=the communication terminal 20, because the server 30 can distribute the in-vehicle terminal software but cannot distribute the vehicle software, the server 30 thereafter performs processing accordingly. Foremost, the software distribution control unit 610 confirms whether there is any update of the in-vehicle terminal software by using configuration information of the in-vehicle terminal software (S804), and, when there is an update, generates update information of the in-vehicle terminal software (in-vehicle terminal software group to be updated and related information (software name and version, restrictions upon performing software update, message to user, etc.)) (information (1)) (S806). Next, the software distribution control unit 610 confirms whether there is any update of the vehicle software (S808), and, when there is an update, generates a list of vehicle software to be updated (list of vehicle software group to be updated and related information) (information (4)) (S810). Subsequently, the software distribution control unit 610 sends the information (1) and the information (4) to the communication terminal 20 via the communication unit 690 (S812). The communication terminal 20 stores the received information (1) and information (4) in the server-acquired information temporary storage unit 524 (S814).

Figure 10:
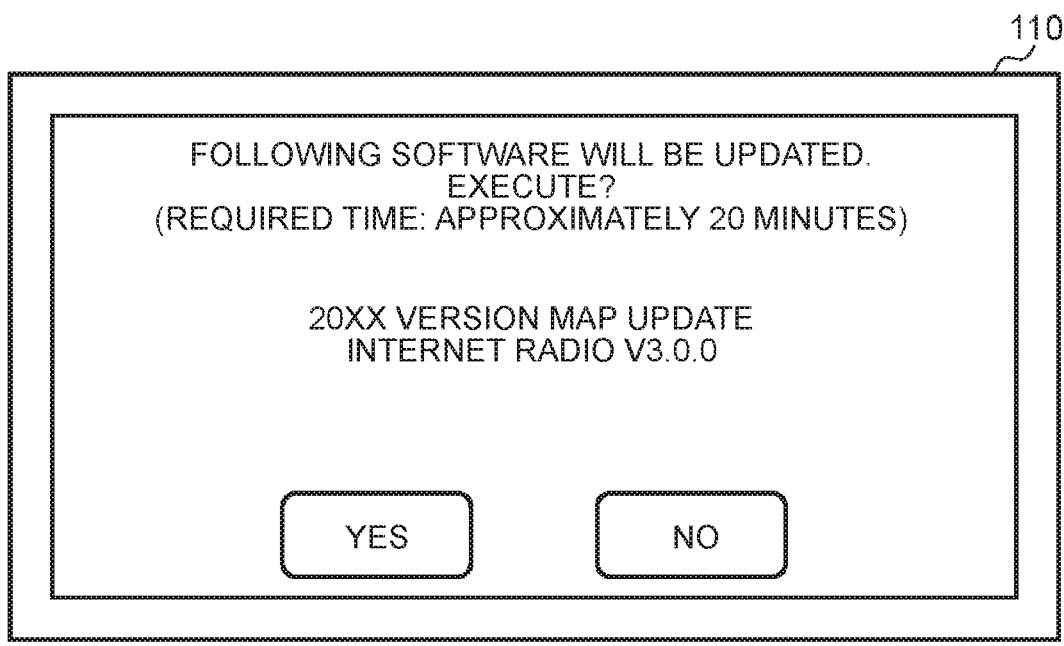
FIG. 10 is a configuration diagram showing a screen display example in the first embodiment.

FIG. 9 describes the processing of the communication terminal 20 executing the software update of the in-vehicle terminal 10 and the vehicle 40 by using the information acquired from the server 30. When some kind of authentication is performed between the in-vehicle terminal 10 and the communication terminal 20 and their connection is completed, the software update mediation control unit 510 of the communication terminal 20 sends the information (1) and the information (4) to the software update control unit 410 of the in-vehicle terminal 10 via the communication unit 590 (S900). The software update control unit 410 stores the received information (1) and information (4) in the software storage unit 444 (S912), and displays, as a GUI, information related to the update of the in-vehicle terminal software on the display device 110 as shown in FIG. 10 based on the received information (1) (S914). When the software update enters an executable state such as when the permission for executing the software update is received from the user (such as when "Yes" is selected in the screen shown in FIG. 10), the software update control unit 410 executes the software update of the in-vehicle terminal 10 based on the received information (1) (S916).

Figure 11:
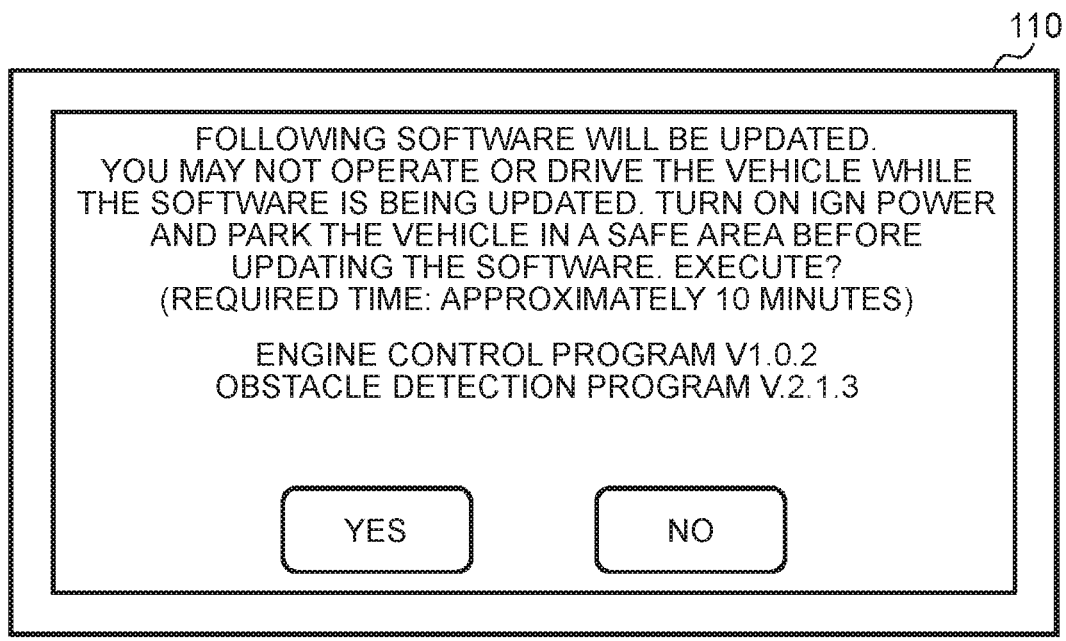
FIG. 11 is a configuration diagram showing a screen display example in the first embodiment.

Next, the software update control unit 410 starts the update processing of the vehicle software by using the received information (4), and displays information related to the update of the vehicle software based on the received information (4), together with complementary information such as precautions, restrictions and instructions in the update of the vehicle software, as a GUI on the display device 110 as shown in FIG. 11 (S918). When the software update enters an executable state such as when the permission for executing the software update is received from the user (such as when "Yes" is selected in the screen shown in FIG. 11), the software update control unit 410 requests the vehicle software update control unit 470 of the vehicle 40 to start the software update (S920).

Because vehicle software is not included in the received information (4), the vehicle software update control unit 470 starts the processing for updating the vehicle software (S930). The vehicle software update control unit 470 acquires configuration information of the vehicle software from the vehicle software configuration management unit 480 in order to generate the configuration information of the vehicle software and the communication path information (S932), and thereafter acquires the communication path (communication path information) that can be used for the software update (S933). Here, the vehicle software update control unit 470 generates communication path information as the communication target (communication destination) of the vehicle communication unit 460 and which is the communication path (communication path=vehicle communication device 44) that can be used for the software update. Next, the vehicle software update control unit 470 connects to the server 30 by using the vehicle communication device 44, performs authentication with the server 30, and sends the configuration information of the vehicle software and the communication path information (communication path=vehicle communication device 44) to the server 30 (S934). In this embodiment, there is no particular limitation in the method of authentication between the vehicle 40 and the server 30. Authentication may be performed based on known methods such as by using share information, by using a common key, or by using a public key.

The software distribution control unit 610 of the server 30 determines that the communication path=the vehicle communication device 44 based on the communication path information received from the vehicle communication device 44 of the vehicle 40 (S940), confirms whether there is any update of the vehicle software based on the configuration information of the vehicle software received from the vehicle communication device 44 of the vehicle 40 (S942), and, when there is a software update, thereafter generates update information of the vehicle software (vehicle software group to be updated and related information (software name and version, restrictions upon performing software update, message to user, etc.)) (information (3)) (S944), and sends the generated information (3) (update information of vehicle software) to the vehicle communication device 44 of the vehicle 40 (S946).

The vehicle software update control unit 470 of the vehicle 40 stores the information (3) received from the server 30 in the vehicle software storage unit 494 (S950), and executes the software update based on the received information (3) (S952).

Figure 12:
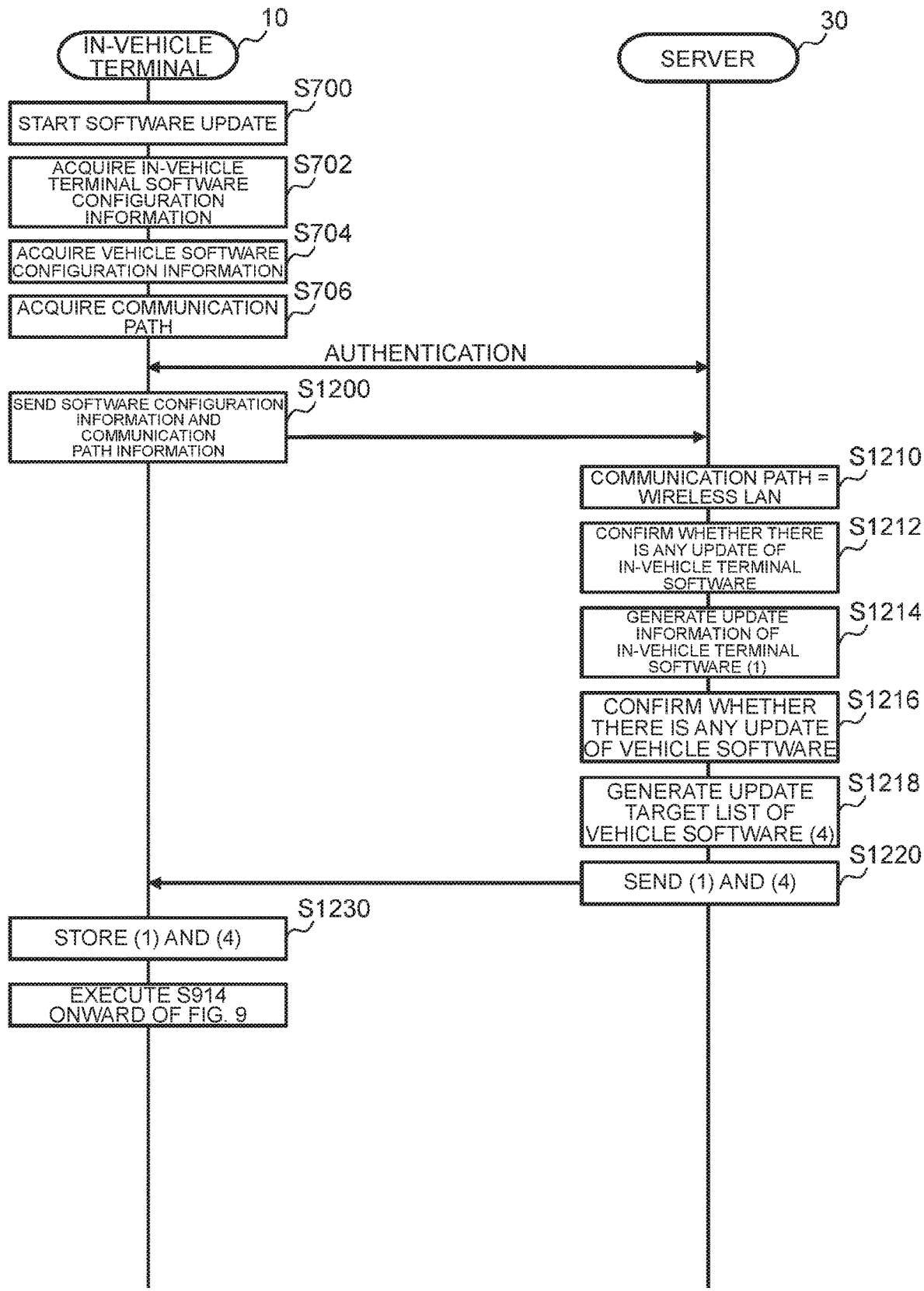
FIG. 12 is a flowchart showing the processing flow of the information distribution system in the first embodiment.

FIG. 12 is an example of a case of using an access point installed outside the vehicle or a wireless LAN (connection) based on the tethering function of the communication terminal 20 as the communication path to be used for the software update. While the in-vehicle terminal 10 communicates with the communication terminal 20 in FIG. 7, the in-vehicle terminal 10 directly communicates with the server 30 in FIG. 12.

When the software update control unit 410 of the in-vehicle terminal 10 starts the software update (S700), the software update control unit 410 executes the same processing as FIG. 7 from S702 to S706, thereafter performs some kind of authentication with the server 30, and sends the configuration information of the in-vehicle terminal and the vehicle software, and the communication path information, to the server 30 (S1200). In the present invention, there is no particular limitation in the method of authentication between the in-vehicle terminal 10 and the server 30. Authentication may be performed based on known methods such as by using share information, by using a common key, or by using a public key.

The server 30 generates the information (1) and the information (4) with the communication path=a wireless LAN, and sends the information (1) and the information (4) to the in-vehicle terminal 10 (S1210 to S1220). In other words, the software distribution control unit 610 of the server 30 identifies the communication path that is being used for the software update as the communication path=the wireless LAN based on the received information (S1210), and thereafter executes the same processing as S804 to S812 of FIG. 8 from S1212 to S1220.

When the software update control unit 410 of the in-vehicle terminal 10 receives the information (1) and the information (4) from the server 30, the software update control unit 410 stores the received information (1) and information (4) in the software storage unit 444 (S1230), and executes, as the subsequent processing, the same processing as S914 to S920 of FIG. 9 based on the information (1) and the information (4). Moreover, in the vehicle 40 the processing of S930 to S934, S950 to S952 of FIG. 9 is executed, and in the server 30 the processing of S940 to S946 of FIG. 9 is executed.

The method of identifying the communication path with the server 30 can be realized by setting the identification information (communication path information) of the communication path as shown in FIG. 7 to FIG. 12, and sending the identification information from the in-vehicle terminal 10, the communication terminal 20 and the vehicle communication device 44. Moreover, when it is possible to identify the communication partner and the path thereof based on mutual authentication or the like, such information (authentication information identified based on authentication) may be used as the identification information. In the foregoing case, because the server 30 can identify the communication path with the information that was used in the mutual authentication with the in-vehicle terminal 10, the communication terminal 20 and the vehicle communication device 44, it is no longer necessary to send the communication path information, as information for identifying the communication path, from the in-vehicle terminal 10, the communication terminal 20 and the vehicle communication device 44 to the server 30.

When there is no software update of the in-vehicle terminal 10 in FIG. 7 to FIG. 12, generation of the information (1) and processing based on the information (1) are not performed. Moreover, when there is no software update of the vehicle 40, generation of the information (4), processing based on the information (4), generation of the information (3), and processing based on the information (3) are not performed.

According to this embodiment, in system of updating software of the vehicle 40 and the in-vehicle terminal 10, it is possible to properly select a communication path having different restrictions depending on the software to be updated. Consequently, the vehicle software and the in-vehicle terminal software can be simultaneously updated.

Second Embodiment

Figure 13:
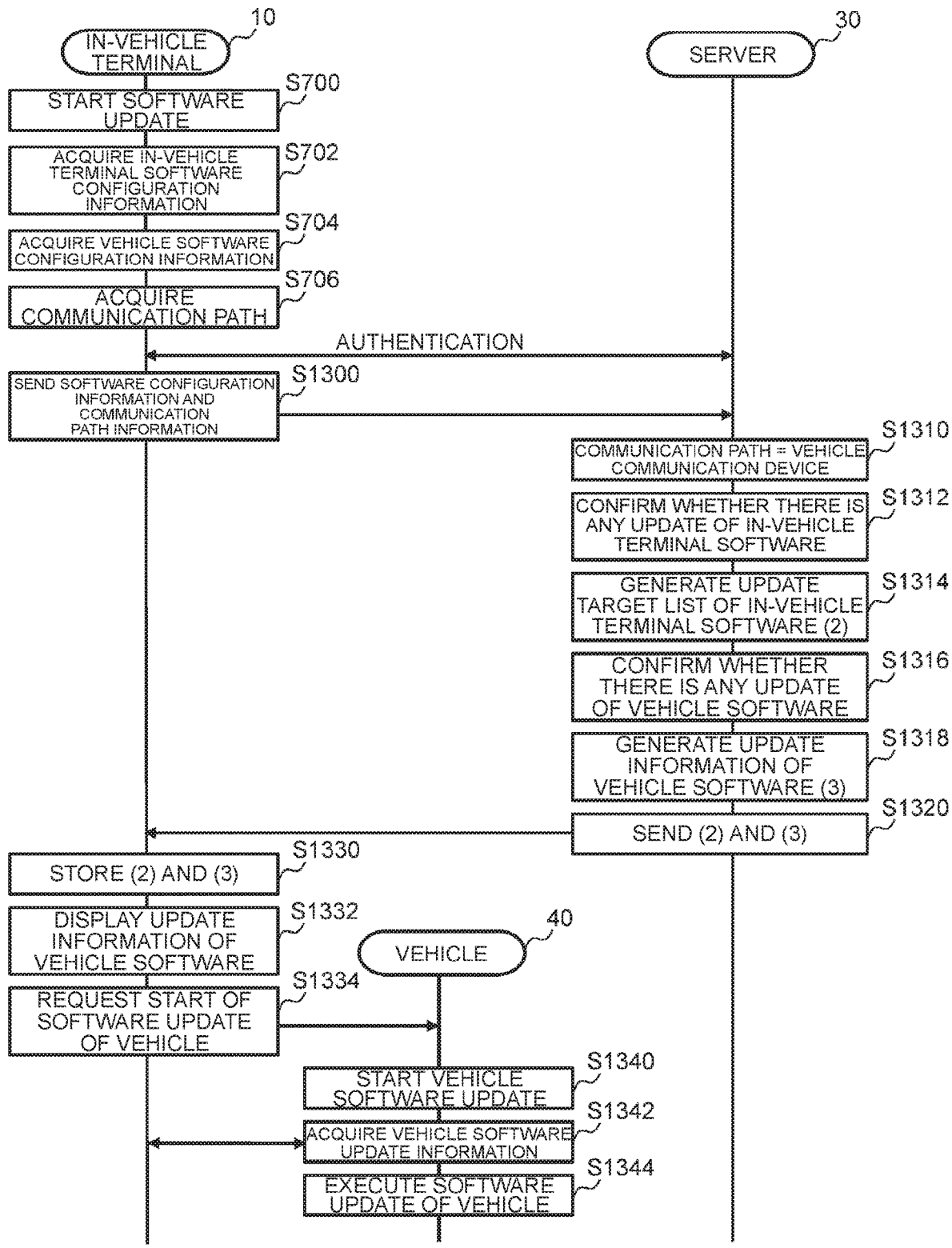
FIG. 13 is a flowchart showing the processing flow of the information distribution system in the second embodiment.
Figure 14:
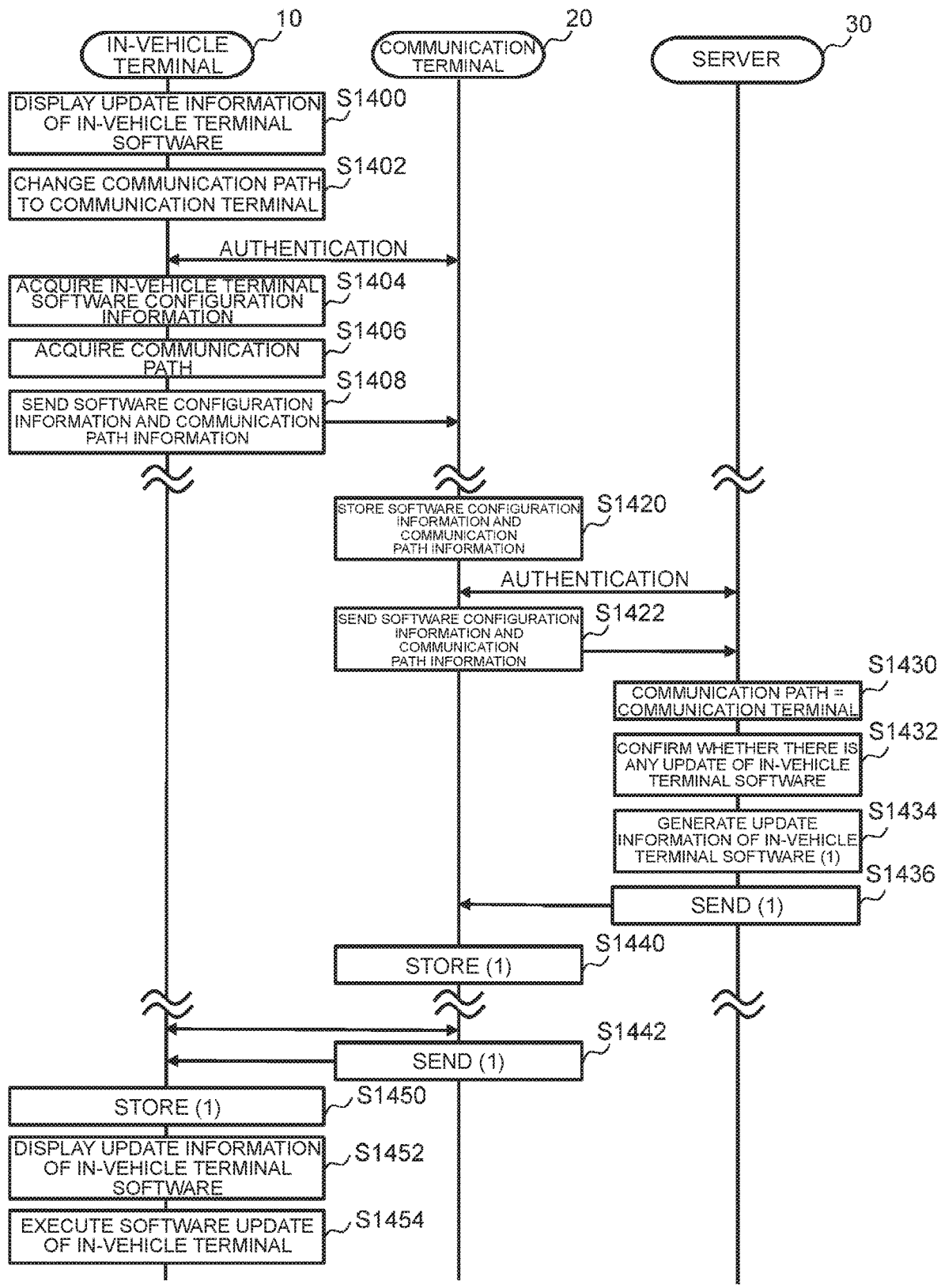
FIG. 14 is a flowchart showing the processing flow of the information distribution system in the second embodiment.
Figure 15:
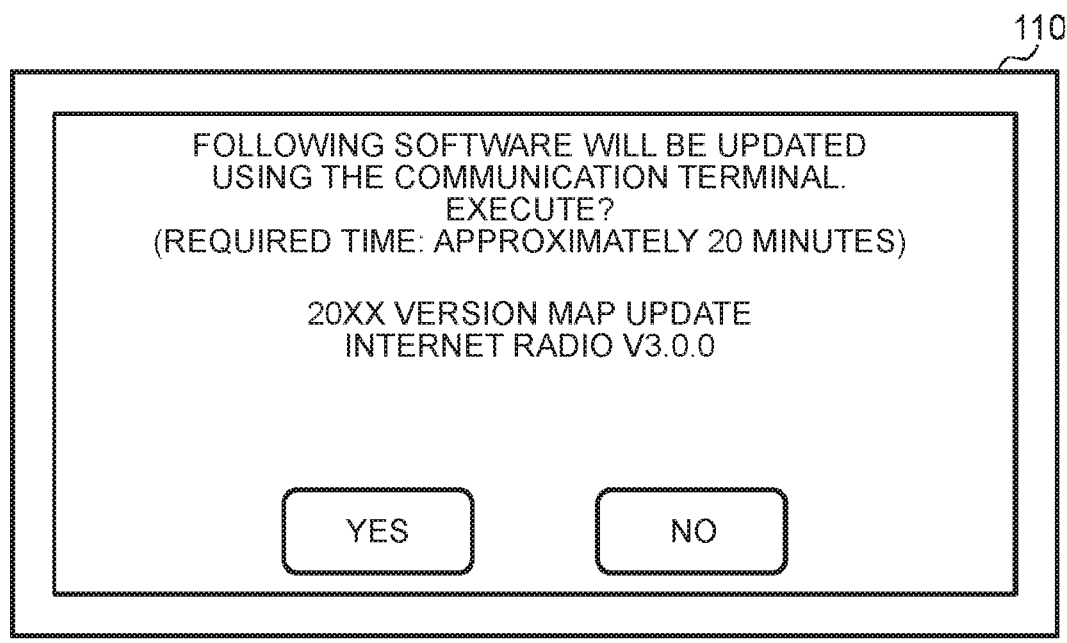
FIG. 15 is a diagram showing a screen display in the second embodiment.

FIG. 13 to FIG. 15 show the second embodiment of the present invention.

The second embodiment of the present invention uses the vehicle communication device 44 as the communication path of the software update of the in-vehicle terminal 10 and the vehicle 40.

When the software update control unit 410 of the in-vehicle terminal 10 starts the software update as shown in FIG. 13 (S700), the software update control unit 410 executes the same processing as FIG. 7 from S702 to S706, thereafter performs some kind of authentication with the server 30, and sends the configuration information of the in-vehicle terminal and the vehicle software, and the communication path information (communication path=vehicle communication device 44), to the server 30 via the vehicle communication device 44 (S1300).

The server 30 performs processing with the communication path=the vehicle communication device 44. When the communication path=the vehicle communication device 44, because the server 30 can distribute the vehicle software but cannot distribute the in-vehicle terminal software, the server 30 thereafter performs processing accordingly. Foremost, the software distribution control unit 610 of the server 30 identifies the communication path that is being used for the software update as the communication path=the vehicle communication device 44 based on the received information (S1310), confirms whether there is any update of the in-vehicle terminal software by using configuration information of the in-vehicle terminal software (S1312), and, when there is an update, generates a list of the in-vehicle terminal software to be updated (list of in-vehicle terminal software group to be updated and related information) (information (2)) (S1314). Next, the software distribution control unit 610 confirms whether there is any update of the vehicle software based on the received information (configuration information of vehicle software) (S1316), and, when there is an update, generates update information of the vehicle software (information (3)) (S1318), and sends the generated information (2) and information (3) to the in-vehicle terminal 10 via the vehicle communication device 44 (S1320).

The software update control unit 410 of the in-vehicle terminal 10 stores the information (2) and the information (3) received from the server 30 in the software storage unit 444 (S1330), displays the update information of the vehicle software on a GUI based on the received information (3) (S1332), and requests the vehicle software update control unit 470 to start the update of the vehicle software (S1334).

The vehicle software update control unit 470 of the vehicle 40 starts the processing for updating the vehicle software (S1340), acquires the update information (information (3)) of the vehicle software from the in-vehicle terminal 10 (S1342), and executes the update of the vehicle software based on the acquired update information (information (3)) of the vehicle software (S1344).

Meanwhile, in order to execute the update of the in-vehicle terminal software based on the received information (2) as shown in FIG. 14, the software update control unit 410 of the in-vehicle terminal 10 displays, as a GUI, the information related to the update of the in-vehicle terminal software on the display device 110 as shown in FIG. 15 (S1400). Here, because the in-vehicle terminal 10 cannot acquire the information (1) (update information of in-vehicle terminal software) from the server 30 with the vehicle communication device 44, the communication path is changed from the vehicle communication device 44 to the communication terminal 20 (S1402). Subsequently, when the software update enters an executable state such as when the permission for executing the software update is received from the user (such as when "Yes" is selected in the screen shown in FIG. 15), the software update control unit 410 performs authentication with the communication terminal 20, and acquires configuration information of the in-vehicle terminal software from the in-vehicle terminal software configuration management unit 420 (S1404). Next, the software update control unit 410 acquires the communication path (communication terminal 20) that can be used for the software update and generates communication path information (S1406), and sends the configuration of the in-vehicle terminal software, and the communication path information, to the communication terminal 20 (S1408).

The software update mediation control unit 510 of the communication terminal 20 stores the foregoing information in the configuration information temporary storage unit 520 and the communication path information temporary storage unit 522 (S1420), thereafter performs authentication with the server 30 via the communication unit 590, and sends the configuration information of the in-vehicle terminal software, and the communication path information (communication path=communication terminal 20), to the server 30 (S1422).

When the software distribution control unit 610 of the server 30 receives information from the communication terminal 20, the software distribution control unit 610 determines that the communication terminal 20 is the communication path that is being used for the software update based on the received information (S1430), confirms whether there is any update of the in-vehicle terminal software by using the configuration information of the in-vehicle terminal software (S1432), and, when there is an update, generates update information of the in-vehicle terminal software (in-vehicle terminal software group to be updated and related information (software name and version, restrictions upon performing software update, message to user, etc.)) (information (1)) (S1434), and sends the generated information (1) to the communication terminal 20 (S1436). The communication terminal 20 stores the received information (1) in the server-acquired information temporary storage unit 524 (S1440), and sends the information (1) to the in-vehicle terminal 10 (S1442).

The software update control unit 410 of the in-vehicle terminal 10 stores the received information (1) in the software storage unit 444 (S1450), and displays information related to the update of the in-vehicle terminal software on the GUI based on the information (1) (S1452). Subsequently, when the software update enters an executable state such as when the permission for executing the software update is received from the user, the software update control unit 410 executes the software update of the in-vehicle terminal 10 by using the received information (1) (S1454).

According to this embodiment, the communication path can be switched to a communication path capable of executing the software update of the in-vehicle terminal 10 even when the vehicle communication device 44 is being used. Consequently, the vehicle software and the in-vehicle terminal software can be simultaneously updated.

Third Embodiment

FIG. 16 to FIG. 20 show the third embodiment of the present invention.

The third embodiment of the present invention deals with a case of avoiding the use of the communication terminal 20 as the communication path for updating the software of the in-vehicle terminal 10.

Figure 4:
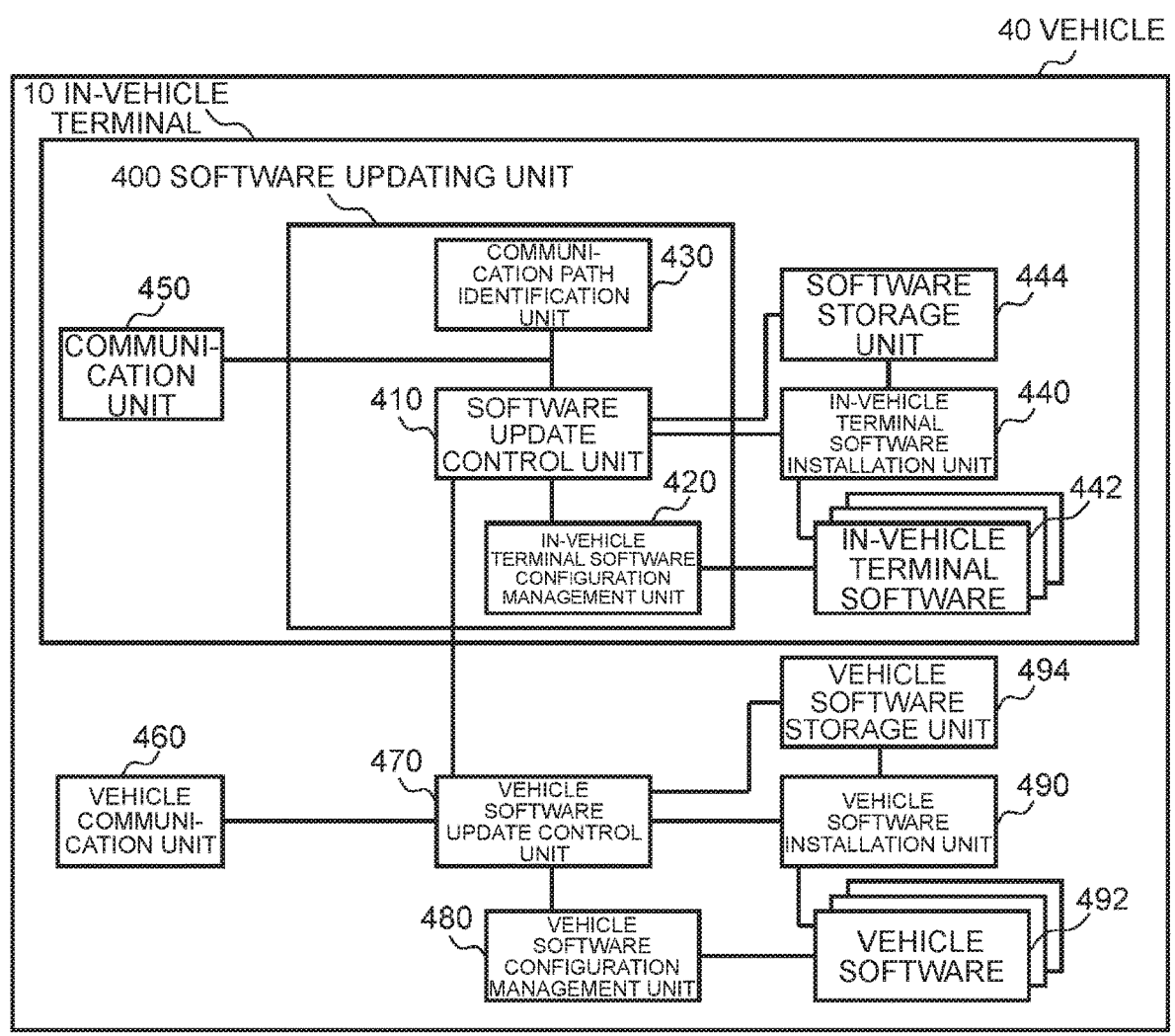
FIG. 4 is a configuration diagram of the software update function in the in-vehicle terminal and the vehicle.
Figure 16:
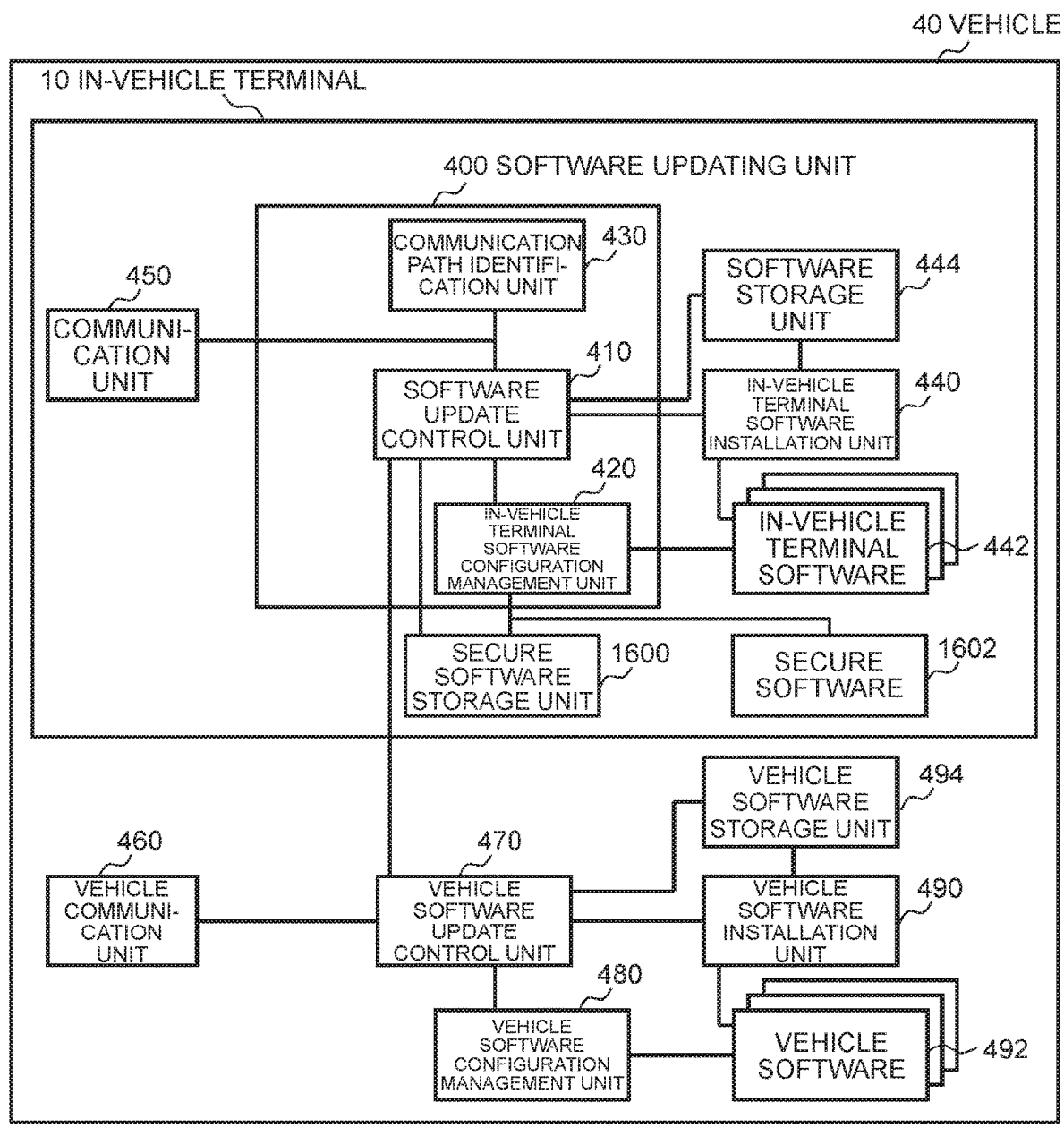
FIG. 16 is a configuration diagram of the software update function in the in-vehicle terminal and the vehicle in the third embodiment.

FIG. 16 is a diagram in which a secure software (soft) storage unit 1600 and a secure software (soft) 1602 have been added to the configuration shown in FIG. 4. The secure software storage unit 1600 stores the software of the in-vehicle terminal 10 for which the use of the communication terminal 20 should be avoided as the communication path of the software update (certification and pair of private keys for authentication, authentication software, security-related software, etc.).

Figure 17:
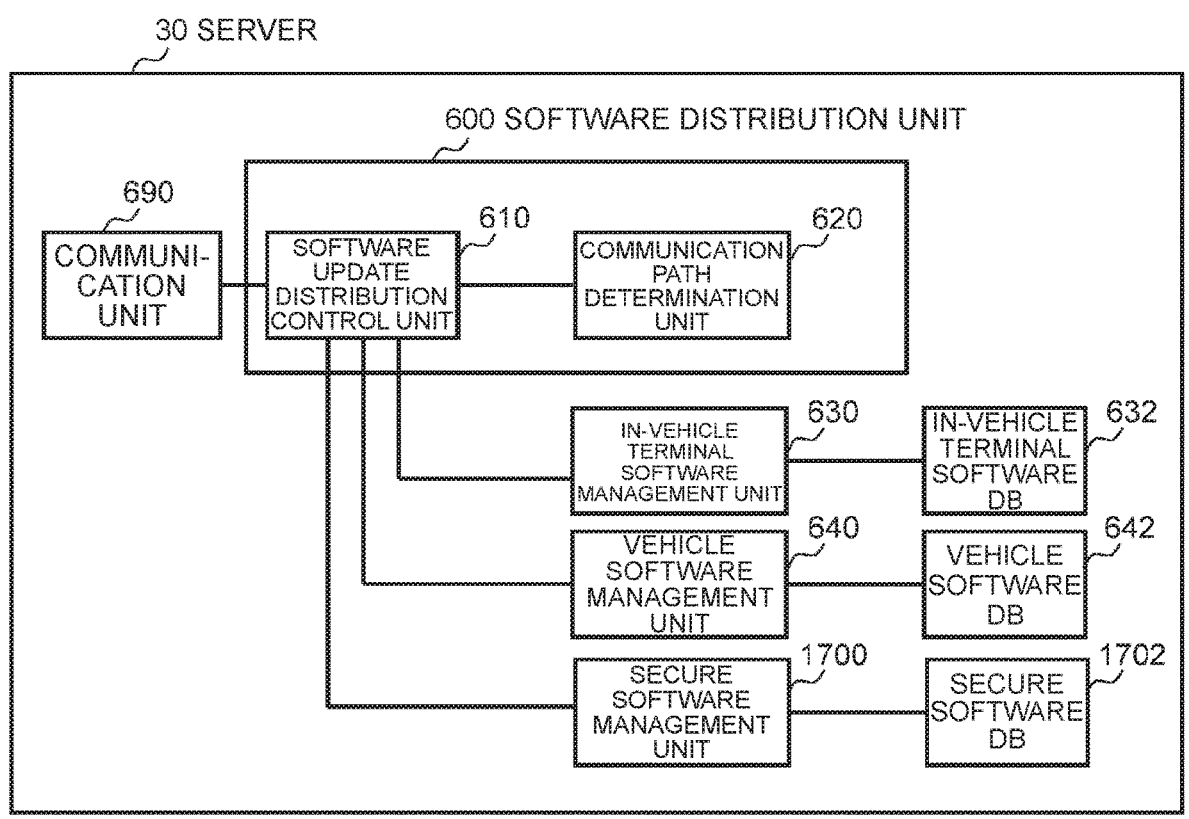
FIG. 17 is a configuration diagram of the software update function in the server in the third embodiment.

FIG. 17 is a diagram in which a secure software (soft) management unit 1700 and a secure software (soft) database 1702 have been added to the configuration shown in FIG. 6. The secure software (soft) management unit 1700 and the secure software (soft) database 1702 have a function of managing and storing software of the in-vehicle terminal 10 for which the use of the communication terminal 20 should be avoided as the communication path of the software update.

Figure 18:
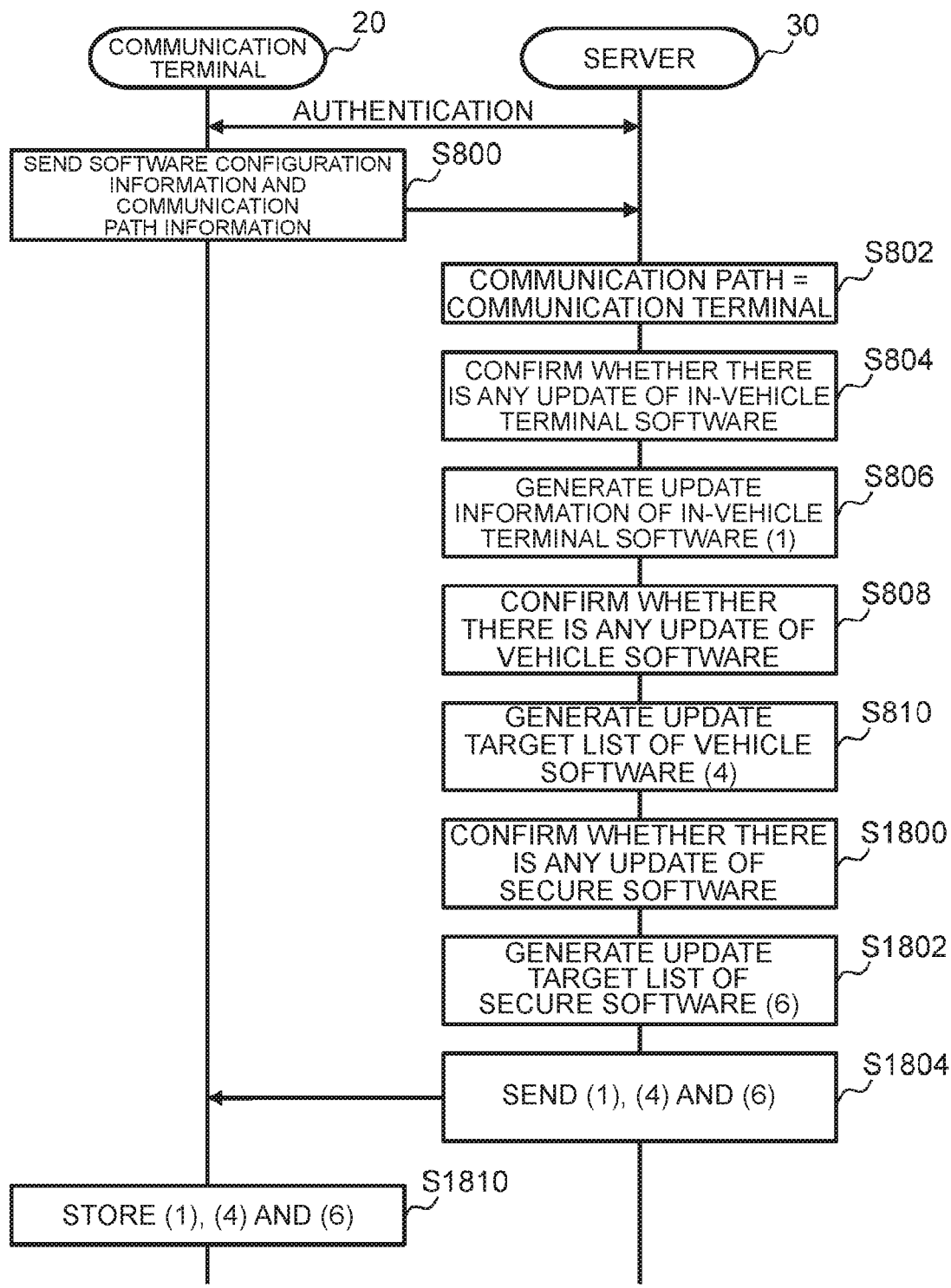
FIG. 18 is a flowchart showing the processing flow of the information distribution system in the third embodiment.

FIG. 18 is a diagram in which processing related to secure software has been added to the configuration shown in FIG. 8. When the server 30 receives configuration information of the in-vehicle terminal software, configuration information of the vehicle software, configuration information of the secure software, and communication path information, which were generated by the software update control unit 410 of the in-vehicle terminal 10, from the communication terminal 20, the server 30 generates a list of secure software to be updated (list of secure software group to be updated and related information) (information (6)) in addition to the received information (1) and information (4), and sends the generated information (6) to the communication terminal 20.

Specifically, when some kind of authentication is performed between the communication terminal 20 and the server 30 and their connection is completed, as shown in FIG. 18, when the software update mediation control unit 510 of the communication terminal 20 receives the configuration information of the in-vehicle terminal and the vehicle software, the communication path information, and the configuration information of the secure software from the in-vehicle terminal 10, the software update mediation control unit 510 sends the received information to the server 30 (S800). When the software distribution control unit 610 of the server 30 receives information from the communication terminal 20, the software distribution control unit 610 determines that the communication terminal 20 is the communication path that is being used for the software update based on the received information (S802), subsequently executes the same processing as S804 to S810 of FIG. 8 from S804 to S810, thereafter confirms whether there is any update of the secure software (S1800), and, when there is an update, generates a list of secure software to be updated (list of secure software to be updated and related information) (information (6)) (S1802), and sends the generated information (1), information (4) and information (6) to the communication terminal 20 (S1804). The communication terminal 20 stores the received information (1), information (4) and information (6) in the server-acquired information temporary storage unit 524 (S1810).

Figure 19:
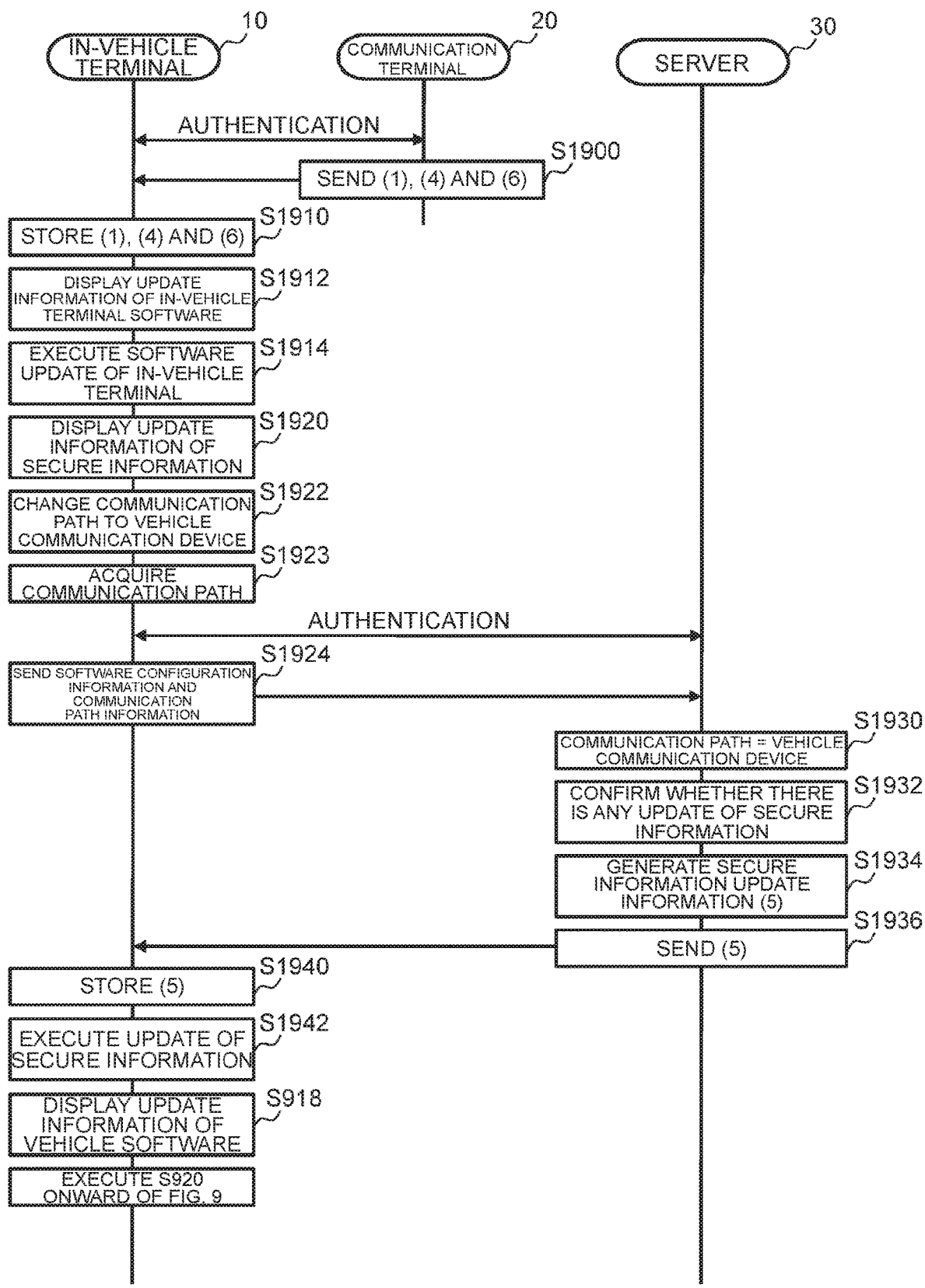
FIG. 19 is a flowchart showing the processing flow of the information distribution system in the third embodiment.

When some kind of authentication is performed between the in-vehicle terminal 10 and the communication terminal 20 and their connection is completed, as shown in FIG. 19, the software update mediation control unit 510 of the communication terminal 20 sends the received information (1), information (4) and information (6) to the software update control unit 410 of the in-vehicle terminal 10 (S1900). The software update control unit 410 stores the information (1), the information (4) and the information (6) in the software storage unit 444 (S1910), and displays information related to the update of the in-vehicle terminal software on the GUI based on the information (1) (S1912). When the software update enters an executable state such as when the permission for executing the software update is received from the user, the software update control unit 410 executes the software update of the in-vehicle terminal 10 by using the received information (1) (S1914).

Figure 20:
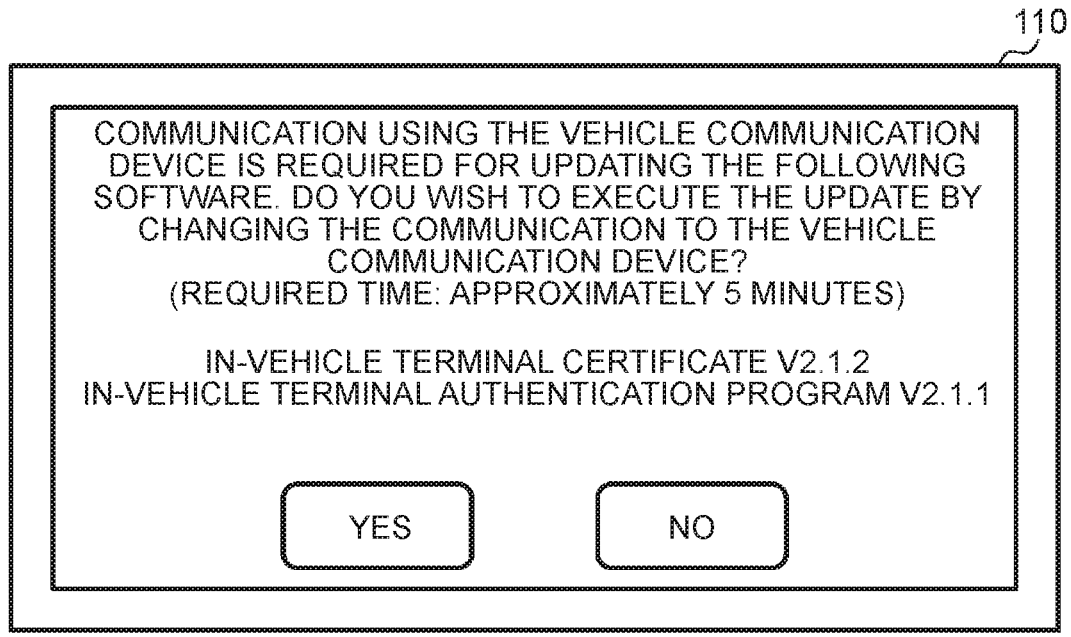
FIG. 20 is a configuration diagram showing a screen display example in the third embodiment.

Next, the software update control unit 410 displays information related to the update of the secure software based on the received information (6), together with complementary information such as precautions, restrictions and instructions in the update of the secure software, as a GUI on the display device 110 as shown in FIG. 20 (S1920). Here, because the server 30 cannot receive the update information of the secure software (secure software group to be updated and related information (software name and version, restrictions upon performing software update, message to user, etc.)) (information (5)) when the communication path is the communication terminal 20, the software update control unit 410 changes the communication path from the communication terminal 20 to the vehicle communication device 44 (S1922), Next, the software update control unit 410 acquires the communication path (communication path=vehicle communication device 44) that can be used for the software update (S1923), subsequently performs authentication with the server 30, and sends the configuration of the secure software, and the communication path information, to the server 30 via the vehicle communication device 44 (S1924).

The software distribution control unit 610 of the server 30 determines that the communication path=the vehicle communication device 44 based on the configuration information of the secure software and the communication path information (communication path=vehicle communication device 44) received from the vehicle communication device 44 of the vehicle 40 (S1930), confirms whether there is any update of the secure software based on the configuration information of the secure software (S1932), and, when there is a software update, subsequently generates the update information (information (5)) of the secure software based on the received information (S1934), and sends the generated information (5) to the in-vehicle terminal 10 via the vehicle communication device 44 (S1936).

When the software update control unit 410 of the in-vehicle terminal 10 receives the information (5) from the communication terminal 20 via the vehicle communication device 44 (S1940), the software update control unit 410 executes the update processing of the secure software based on the received information (5) (S1942), subsequently displays the update information of the vehicle software as a GUI on the display device 110 (S918), and thereafter executes the same processing as S920 of FIG. 9. Here, in the same manner as FIG. 9, in the vehicle 40 the processing of S930 to S934, S950, S952 is executed, and in the server 30 the processing of S940 to S946 is executed.

According to this embodiment, even when the use of the communication terminal 20 is to be avoided as the communication path of the software update, the vehicle software and the in-vehicle terminal software can be simultaneously updated by the in-vehicle terminal 10 changing the communication path from the communication terminal 20 to the vehicle communication device 44 midway during the communication.

Fourth Embodiment

Figure 21:
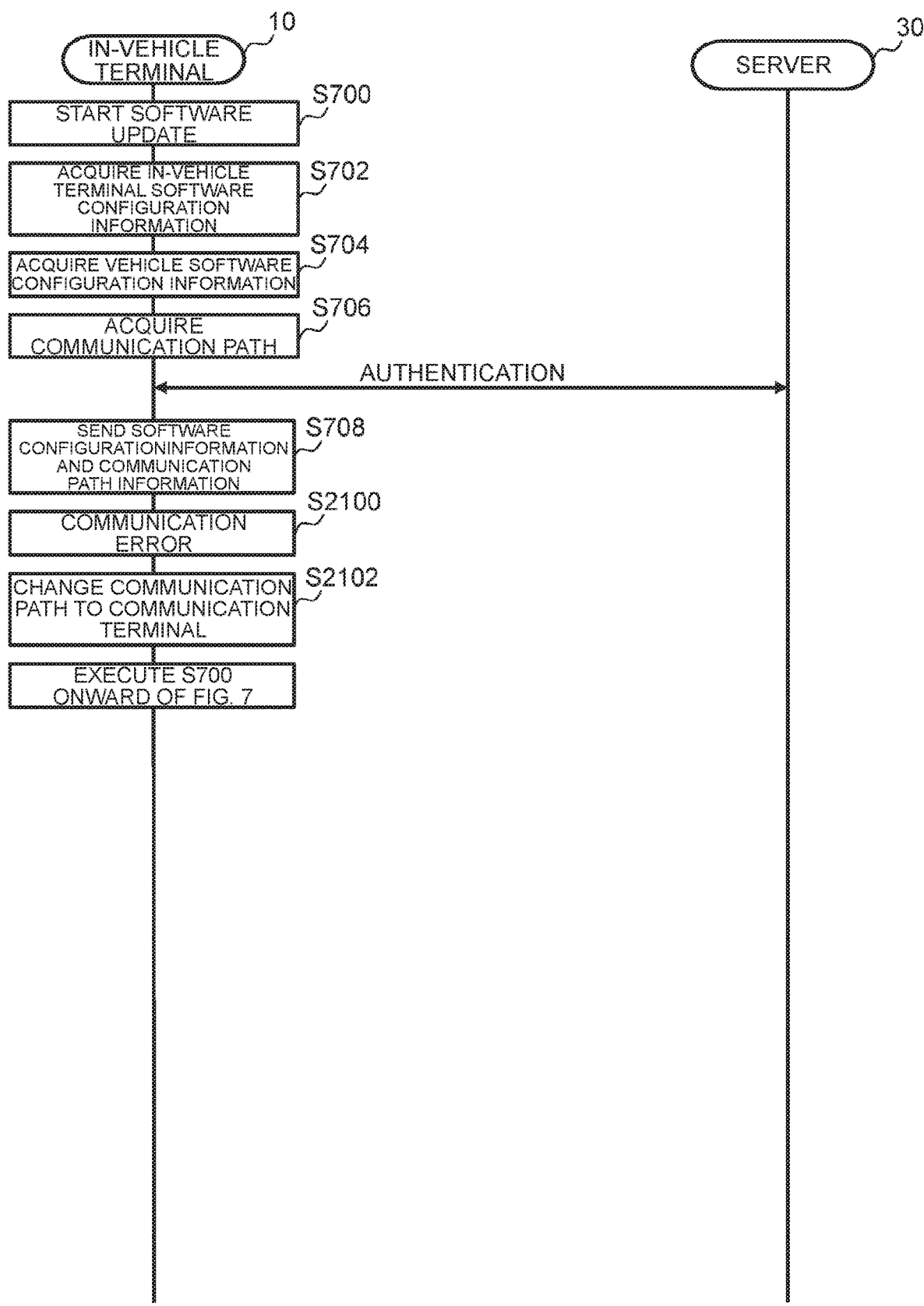
FIG. 21 is a flowchart showing the processing flow of the information distribution system in the fourth embodiment.
Figure 22:
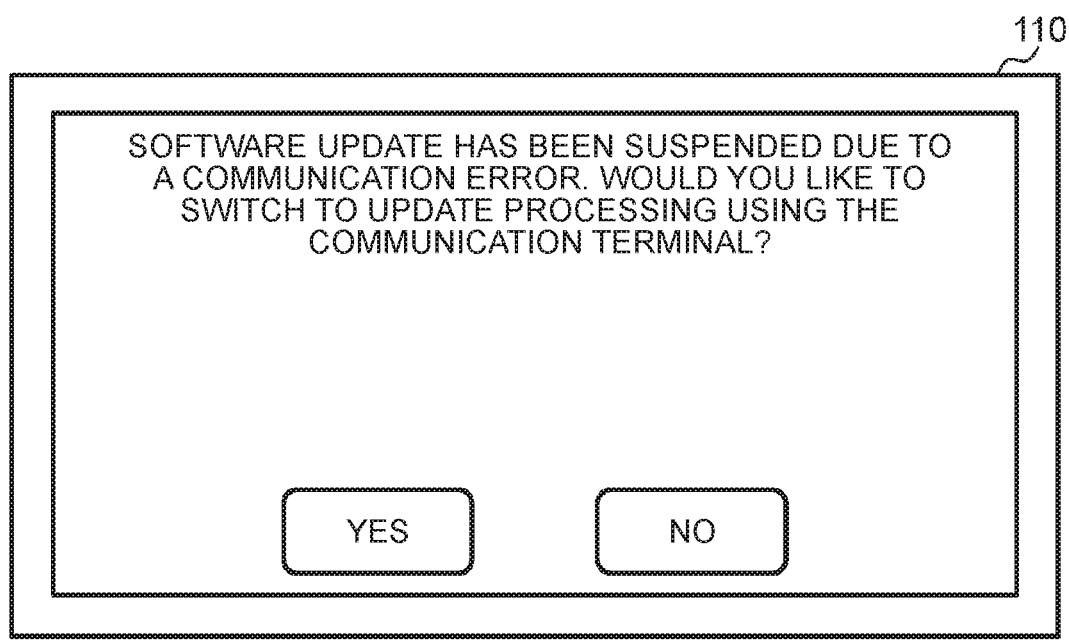
FIG. 22 is a configuration diagram showing a screen display example in the fourth embodiment.

FIG. 21 and FIG. 22 show the fourth embodiment of the present invention.

The fourth embodiment of the present invention is for changing the communication path so that the communication terminal 20 can be used as the communication path of the software update at locations where a communication error, such as disruption of communication, may occur during the use of the vehicle communication device 44 such as in underground parking or a location that is distant from the base station of the mobile phone network.

FIG. 21 is a diagram in which the processing of a communication error S2100 has been added to the configuration of FIG. 13. When the software update control unit 410 of the in-vehicle terminal 10 starts the software update (S700), the software update control unit 410 executes the same processing as FIG. 7 from S702 to S706, subsequently performs some kind of authentication with the server 30 via the vehicle communication device 44, and sends the configuration information of the in-vehicle terminal and the vehicle software, and the communication path information, to the server 30 via the vehicle communication device 44 (S708). If a communication error occurs when the vehicle communication device 44 is being used as the communication path of the software update (S2100), the software update control unit 410 displays a message to the effect that a communication error occurred in the communication path as a GUI on the display device 110 as shown in FIG. 22. Here, when "Yes" is selected on the screen shown in FIG. 22, the software update control unit 410 changes the communication path from the vehicle communication device 44 to the communication terminal 20 (S2102), and subsequently once again executes the processing of S700 to S708 in the same manner as FIG. 7. Thereafter, in the in-vehicle terminal 10, the communication terminal 20, the server 30, and the vehicle 40 the same processing as S710 to S710 of FIG. 7, S800 to S814 of FIG. 8, and S900 to S952 of FIG. 9 is executed.

According to this embodiment, even if a communication error occurs in underground parking or a location that is distant from the base station of the mobile phone network while the vehicle communication device 44 is being used, the vehicle software and the in-vehicle terminal software can be simultaneously updated by changing the communication path from the vehicle communication device 44 to the communication terminal 20.

Fifth Embodiment

FIG. 23 to FIG. 26 show the fifth embodiment of the present invention.

Figure 23:
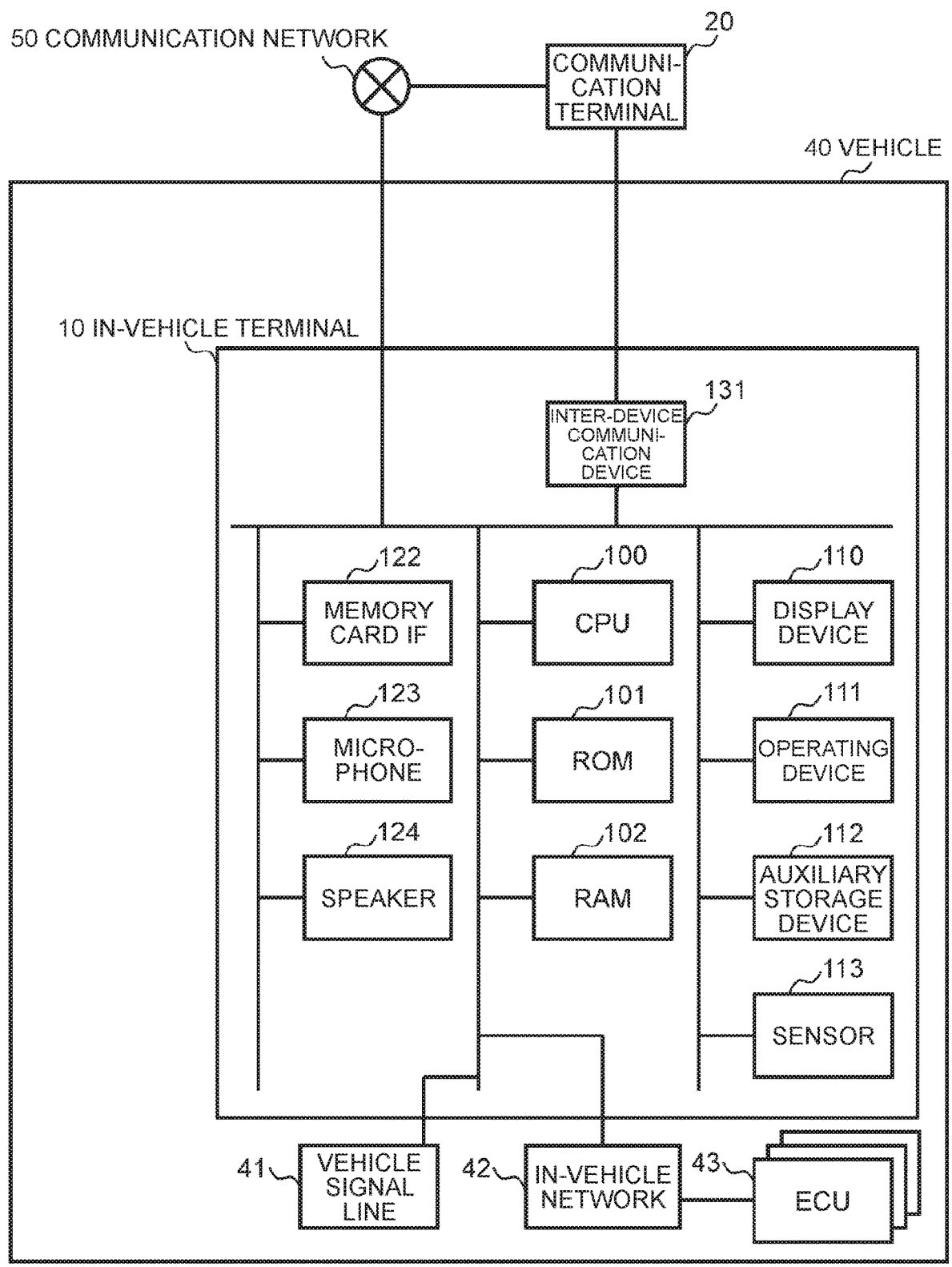
FIG. 23 is a hardware configuration diagram of the in-vehicle terminal and the vehicle in the fifth embodiment.
Figure 24:
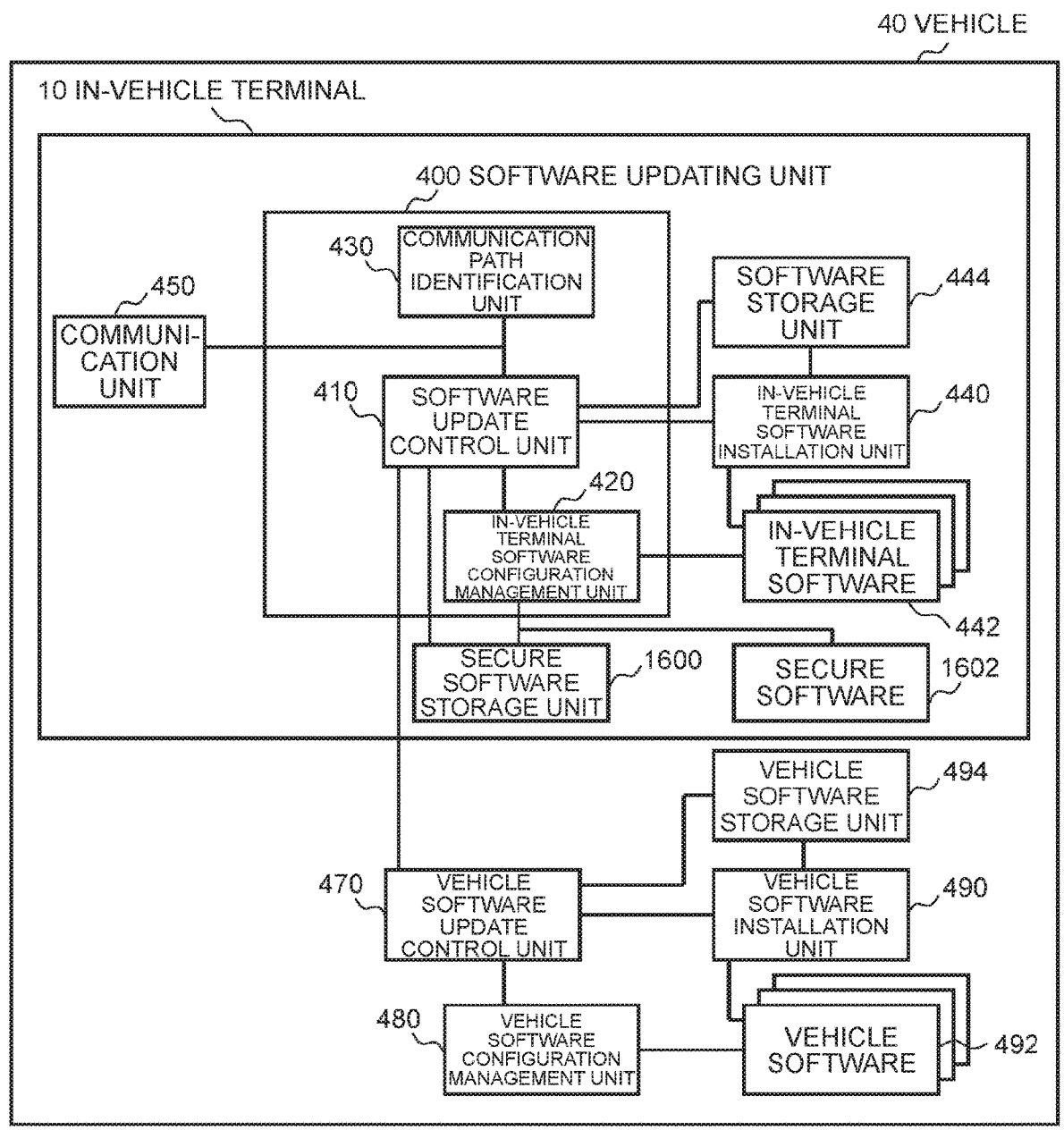
FIG. 24 is a configuration diagram of the software update function in the in-vehicle terminal and the vehicle in the fifth embodiment.

The fifth embodiment of the present invention is a method of providing the software update of the vehicle 40 even when the vehicle 40 is not equipped with the vehicle communication device 44 (FIG. 23, FIG. 24). Specifically, the fifth embodiment of the present invention is a method of updating the vehicle software by using a wireless LAN equipped in the in-vehicle terminal 10 in substitute for the vehicle communication device 44.

Figure 25:
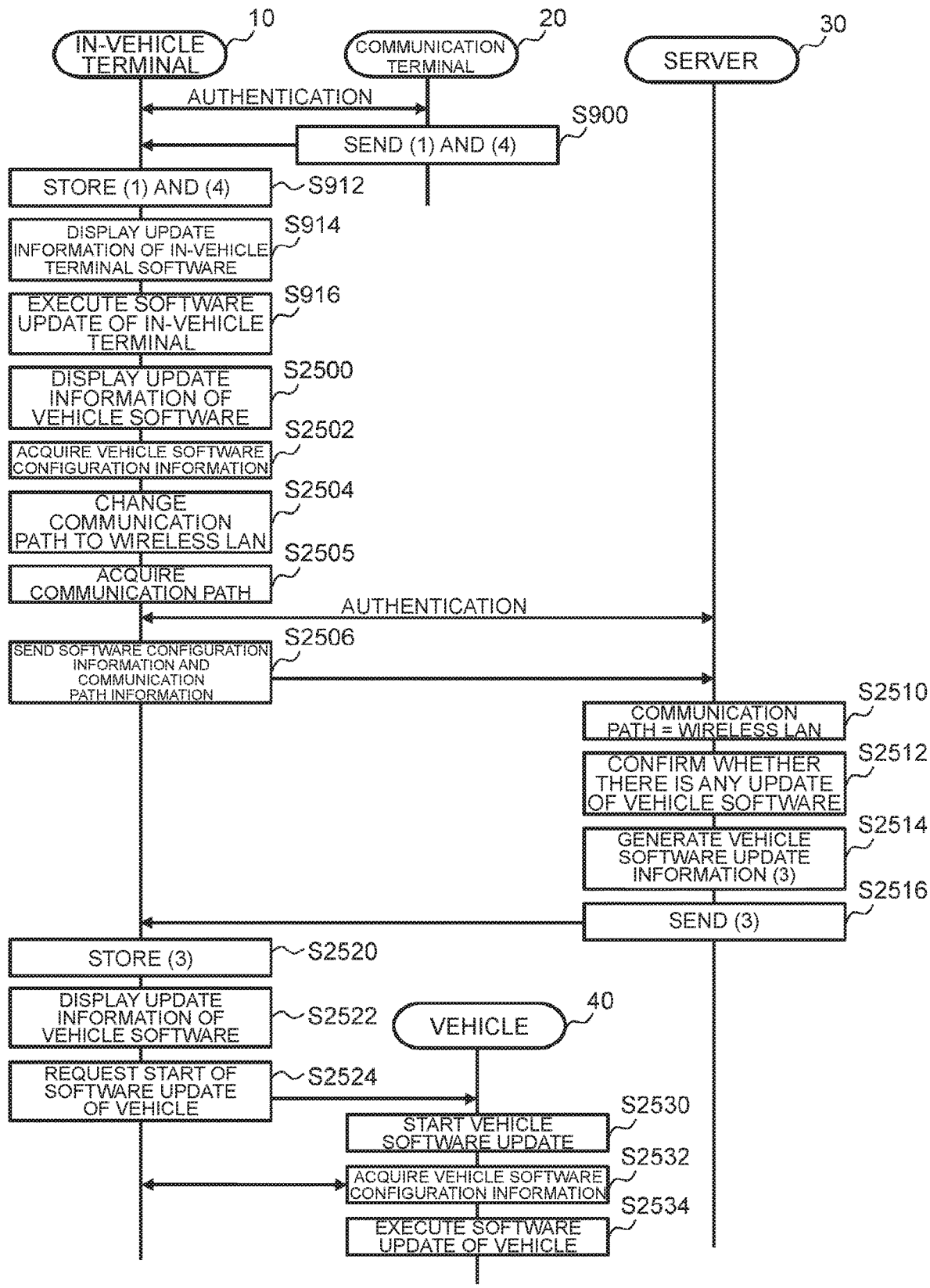
FIG. 25 is a flowchart showing the processing flow of the information distribution system in the fifth embodiment.

FIG. 25 is a diagram in which the update processing of the vehicle software of FIG. 9 has been changed to the method of using a wireless LAN. Foremost, after the same processing as S700 to S710 of FIG. 7 and S800 to S814 of FIG. 8 has been executed, and some kind of authentication is performed between the in-vehicle terminal 10 and the communication terminal 20 and their connection is completed in the same manner as the processing of S900 to S916 of FIG. 9, when the software update mediation control unit 510 of the communication terminal 20 receives the information (1) and the information (4) from the server 30, the software update mediation control unit 510 sends the received information (1) and information (4) to the software update control unit 410 of the in-vehicle terminal 10 (S900). The software update control unit 410 stores the received information (1) and information (4) in the software storage unit 444 (S912), and displays information related to the update of the in-vehicle terminal software on the GUI based on the received information (1) (S914). Subsequently, when the software update enters an executable state such as when the permission for executing the software update is received from the user, the software update control unit 410 executes the software update of the in-vehicle terminal 10 by using the received information (1) (S916).

Figure 26:
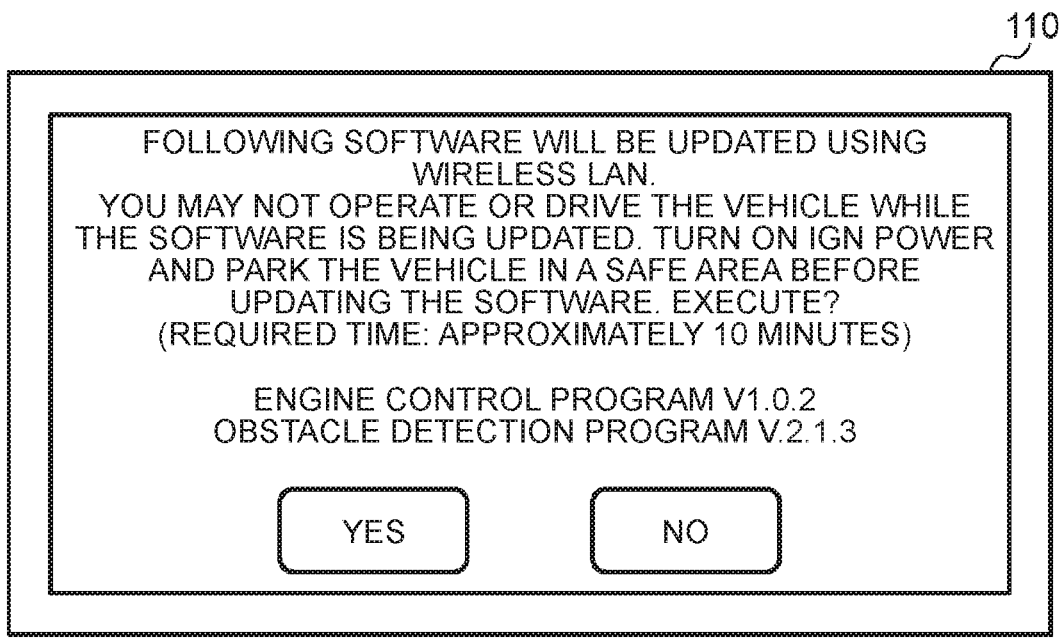
FIG. 26 is a configuration diagram showing a screen display example in the fifth embodiment.

Next, the software update control unit 410 displays information related to the update of the vehicle software based on the received information (4), together with complementary information such as precautions, restrictions and instructions in the update of the secure software, as a GUI on the display device 110 as shown in FIG. 26 (S2500). When the software update enters an executable state such as when the permission for executing the software update is received from the user (such as when "Yes" is selected in the screen shown in FIG. 26), the software update control unit 410 acquires configuration information of the vehicle software (S2502), changes the communication path from the communication terminal 20 to a wireless LAN (S2504), acquires the communication path (wireless LAN) that can be used for the software update, and generates communication path information (S2505). Subsequently, the software update control unit 410 performs some kind of authentication with the server 30, and sends the configuration information of the vehicle software, and the communication path information (communication path=wireless LAN), to the server 30 (S2506).

The software distribution control unit 610 of the server 30 determines that the communication path=the wireless LAN based on the configuration information of the vehicle software and the communication path information received from the in-vehicle terminal 10 (S2510), confirms whether there is any update of the vehicle software (S2512), and, when there is a software update, subsequently generates update information of the vehicle software (vehicle software group to be updated and related information (software name and version, restrictions upon performing software update, message to user, etc.)) (information (3)) (S2514), and sends the generated information (3) (update information of vehicle software) to the in-vehicle terminal 10 via the wireless LAN (S2516). Here, the software distribution control unit 610 generates the information (3) as the update information of the vehicle software and sends the generated information (3) to the in-vehicle terminal 10 via the wireless LAN even when the communication path is the wireless LAN, unlike the processing of S1210 to S1220 of FIG. 12, on the condition that the information received from the in-vehicle terminal 10 is the configuration information of the vehicle software and the communication path information (communication path=wireless LAN).

The software update control unit 410 of the in-vehicle terminal 10 stores the information (3) received from the server 30 in the software storage unit 444 (S2520), displays the update information of the vehicle software on the GUI based on the received information (3) (S2522), and requests the vehicle software update control unit 470 of the vehicle to start the update of the vehicle software (S2524).

The vehicle software update control unit 470 of the vehicle 40 starts the processing for updating the vehicle software (S2530), acquires the update information (information (3)) of the vehicle software from the in-vehicle terminal 10 (S2532), and executes the update of the vehicle software based on the acquired update information (information (3)) of the vehicle software (S2534).

According to this embodiment, even when the vehicle 40 is not equipped with the vehicle communication device 44, the vehicle software and the in-vehicle terminal software can be updated simultaneously by using a communication path other than the vehicle communication device 44 as the communication path.

Note that the present invention is not limited to the foregoing embodiments, and includes various modified examples. For example, the foregoing embodiments were explained in detail for explaining the present invention in an easy-to-understand manner, and the present invention does not need to necessarily comprise all of the configurations explained in the embodiments. Moreover, a part of the configuration of a certain embodiment may be replaced with the configuration of another embodiment, and the configuration of another embodiment may be added to the configuration of one embodiment. Moreover, another configuration may be added to, deleted from or replaced with a part of the configuration of each embodiment.

Moreover, a part or all of the respective configurations, functions, processing units, and processing means described above may be realized with hardware such as an integrated circuit. Moreover, each of the foregoing configurations and functions may also be realized with software by a processor interpreting programs for realizing the respective functions and executing such programs. Information of programs, data and files for realizing the respective functions may be recorded in a memory, a hard disk, an SSD (Solid State Drive) or any other recording device, or may otherwise be recorded on an IC card, an SD card, a DVD or any other recording medium.

Moreover, control lines and information lines are shown to the extent deemed required for explaining the present invention, and not all control lines and information lines required for the product are necessarily indicated. It would be fair to deem that, in effect, nearly all configurations are mutually connected.

REFERENCE SIGNS LIST 10 in-vehicle terminal, 20 communication terminal, 30 server, 40 vehicle, 44 vehicle communication device, 50 communication network, 400 software updating unit, 410 software update control unit, 420 in-vehicle terminal software configuration management unit, 430 communication path identification unit, 440 in-vehicle terminal software installation unit, 442 in-vehicle terminal software, 444 software storage unit, 470 vehicle software update control unit, 480 vehicle software configuration management unit, 490 vehicle software installation unit, 492 vehicle software, 494 vehicle software storage unit, 500 software update mediation unit, 510 software update mediation control unit, 600 software distribution unit, 610 software distribution control unit, 620 communication path determination unit, 630 in-vehicle terminal software management unit, 640 vehicle software management unit, 1600 secure software storage unit, 1700 secure software management unit

The invention claimed is:

1. An information distribution system, comprising:
   a vehicle control device which controls a control target related to a driving of a vehicle based on vehicle software and manages information related to the vehicle software;
   an in-vehicle terminal coupled to the vehicle control device which sends and receives information to and from the vehicle control device, and manages information related to in-vehicle terminal software different from the vehicle software;
   a server which manages a vehicle communication device connected to the vehicle control device and the in-vehicle terminal as a communication target, and manages information related to an update of the vehicle software and the in-vehicle terminal software; and
   a communication terminal which relays communication between the in-vehicle terminal and the server,
   wherein the in-vehicle terminal, upon starting a software update of the vehicle software or the in-vehicle terminal software, transmits configuration information of the in-vehicle terminal software or configuration information of the vehicle software to the server, or to the communication terminal, by using a communication path of the software update, wherein the configuration information of the in-vehicle terminal software includes software version installed in the in-vehicle terminal, hardware configuration and model number of the in-vehicle terminal,
   wherein, when the in-vehicle terminal uses the vehicle communication device that is connected to the vehicle control device and the in-vehicle terminal as the communication path of the software update, the vehicle control device transmits the configuration information of the in-vehicle terminal software or the configuration information of the vehicle software to the sever via the vehicle communication device, and
   wherein, upon receiving the configuration information of the in-vehicle terminal software or the configuration information of the vehicle software from the in-vehicle terminal, from the communication terminal or from the vehicle communication device, the server generates, based on the received information and identified communication path of the software update used by the in-vehicle terminal, the communication terminal or the vehicle communication device,
      software to be distributed which includes update information of the vehicle software which can be distributed through the communication path, update information of the in-vehicle terminal software which can be distributed through the communication path,
      a list of vehicle software to be updated which cannot be distributed through the communication path, or a list of in-vehicle terminal software to be updated which cannot be distributed through the communication path, as information which was excluded from the software to be distributed, and
      sends the generated software to be distributed, the generated list of vehicle software to be updated, or the generated list of in-vehicle terminal software to be updated to the in-vehicle terminal, the communication terminal or the vehicle communication device.

2. The information distribution system according to claim 1, wherein the server uses, as the identification information, authentication information identified through authentication with the information source.

3. The information distribution system according to claim 1,
   wherein, upon sending at least one of the configuration information of the in-vehicle terminal software or the configuration information of the vehicle software to a communication target including the server or the communication terminal by using a communication path of the software update, the in-vehicle terminal sends, to the server or the communication terminal, communication path information for identifying a communication path to be used for communicating with the communication target as information to be used by the server as the identification information, and
   wherein, upon sending at least one of the configuration information of the in-vehicle terminal software or the configuration information of the vehicle software to the server via the vehicle communication device, the vehicle control device sends, to the server, communication path information for identifying a communication path to be used for communicating with the server as information to be used by the server as the identification information.

4. The information distribution system according to claim 1, wherein, upon receiving the configuration information of the in-vehicle terminal software and the configuration information of the vehicle software from the in-vehicle terminal via the communication terminal, the server generates update information of the in-vehicle terminal software as software to be distributed based on the received information and the identification information, generates a list of vehicle software to be updated as information which was excluded from the software to be distributed, and sends the generated update information of the in-vehicle terminal software and the generated list of vehicle software to be updated to the in-vehicle terminal via the communication terminal, wherein,
   upon receiving update information of the in-vehicle terminal software from the server, the in-vehicle terminal updates the in-vehicle terminal software based on the received update information of the in-vehicle terminal software, and requests the vehicle control device to start the update of the vehicle software, wherein
   the vehicle control device sends the configuration information of the vehicle software to the server via the vehicle communication device in response to the request from the in-vehicle terminal, wherein,
   upon further receiving the configuration information of the vehicle software from the vehicle communication device, the server generates update information of the vehicle software as software to be distributed, and sends the generated update information of the vehicle software to the vehicle control device via the vehicle communication device, and wherein, upon further receiving update information of the vehicle software via the vehicle communication device, the vehicle control device updates the vehicle software based on the received update information of the vehicle software.

5. The information distribution system according to claim 4, wherein, when a wireless LAN is used as a communication path of the software update and upon receiving the configuration information of the in-vehicle terminal software and the configuration information of the vehicle software from the in-vehicle terminal via the wireless LAN, the server sends the generated update information of the in-vehicle terminal software and the generated list of vehicle software to be updated to the in-vehicle terminal via the wireless LAN.

6. The information distribution system according to claim 1, wherein, upon receiving the configuration information of the in-vehicle terminal software and the configuration information of the vehicle software from the in-vehicle terminal via the vehicle communication device, the server generates update information of the vehicle software as software to be distributed based on the received information and the identification information, generates a list of in-vehicle terminal software to be updated as information which was excluded from the software to be distributed, and sends the generated update information of the vehicle software and the generated list of in-vehicle terminal software to be updated to the in-vehicle terminal via the vehicle communication device, wherein, upon receiving update information of the vehicle software from the server, the in-vehicle terminal requests the vehicle control device to start updating the vehicle software, wherein the vehicle control device acquires update information of the vehicle software from the in-vehicle terminal in response to the request from the in-vehicle terminal, and updates the vehicle software based on the acquired update information of the vehicle software, wherein, upon further receiving a list of in-vehicle terminal software to be updated from the server, the in-vehicle terminal changes a communication path of the software update from the vehicle communication device to the communication terminal, and sends the configuration information of the in-vehicle terminal software to the server via the communication terminal, wherein, upon further receiving the configuration information of the in-vehicle terminal software from the communication terminal, the server generates update information of the in-vehicle terminal software based on the received configuration information of the in-vehicle terminal software, and sends the generated update information of the in-vehicle terminal software to the in-vehicle terminal via the communication terminal, and wherein, upon further receiving update information of the in-vehicle terminal software from the communication terminal, the in-vehicle terminal updates the in-vehicle terminal software based on the received update information of the in-vehicle terminal software.

7. The information distribution system according to claim 1, wherein, upon receiving the configuration information of the in-vehicle terminal software and the configuration information of the vehicle software from the in-vehicle terminal via the communication terminal, the server generates update information of the in-vehicle terminal software as software to be distributed based on the received information and the identification information, generates a list of vehicle software to be updated as information which was excluded from the software to be distributed, and sends the generated update information of the in-vehicle terminal software and the generated list of vehicle software to be updated to the in-vehicle terminal via the communication terminal, wherein, upon receiving update information of the in-vehicle terminal software from the server, the in-vehicle terminal updates the in-vehicle terminal software based on the received update information of the in-vehicle terminal software, changes a communication path of the software update from the communication terminal to a wireless LAN, and sends the configuration information of the vehicle software to the server via the wireless LAN, wherein, upon further receiving the configuration information of the vehicle software from the in-vehicle terminal via the wireless LAN, the server generates update information of the vehicle software as software to be distributed, and sends the generated update information of the vehicle software to the in-vehicle terminal via the wireless LAN, wherein, upon receiving update information of the vehicle software from the server, the in-vehicle terminal requests the vehicle control device to start updating the vehicle software, and wherein the vehicle control device acquires update information of the vehicle software from the in-vehicle terminal in response to the request from the in-vehicle terminal, and updates the vehicle software based on the acquired update information of the vehicle software.

8. The information distribution system according to claim 4, wherein, upon receiving the configuration information of the in-vehicle terminal software and the configuration information of the vehicle software from the in-vehicle terminal via the communication terminal, when the server receives the configuration information of secure software including information to avoid use of the communication terminal in addition to the received information, the server generates an update target list of the secure software, and sends the generated update target list of the secure software to the in-vehicle terminal via the communication terminal, wherein, upon receiving an update target list of the secure software from the communication terminal, the in-vehicle terminal changes a communication path of the software update from the communication terminal to the vehicle communication device, and sends the configuration information of the secure software to the server via the vehicle communication device, wherein, upon further receiving the configuration information of the secure software from the vehicle communication device, the server generates update information of the secure software, and sends the generated update information of the secure software to the in-vehicle terminal via the vehicle communication device, and wherein, upon further receiving update information of the secure software from the vehicle communication device, the in-vehicle terminal updates the secure software based on the received update information of the secure software.

9. The information distribution system according to claim 4, wherein,
upon receiving update information of the in-vehicle terminal software, the in-vehicle terminal displays, on a display device, information indicating whether update of the in-vehicle terminal software is required, and updates the in-vehicle terminal software on the condition that information urging the update of the in-vehicle terminal software is input from the display device, and
upon receiving a list of vehicle software to be updated, the in-vehicle terminal displays, on a display device, information indicating whether update of the vehicle software is required, and requests the vehicle control device to start updating the vehicle software on the condition that information urging the update of the vehicle software is input from the display device.

10. The information distribution system according to claim 1, wherein, if a communication error occurs in a communication path to be used as a communication path of the software update, the in-vehicle terminal changes a communication path of the software update from the communication path in which a communication error occurred to another communication path.

11. An in-vehicle device, comprising:
a vehicle control device which communicates, via a vehicle communication device, with a server which manages information related to an update of vehicle software and in-vehicle terminal software, controls a control target related to a driving of a vehicle based on vehicle software and manages information related to the vehicle software; and
an in-vehicle terminal coupled to the vehicle control device which communicates with the server or a communication terminal, sends and receives information to and from the vehicle control device, and manages information related to the in-vehicle terminal software different from the vehicle software; wherein,
upon receiving at least one of configuration information of the in-vehicle terminal software or configuration information of the vehicle software from the in-vehicle terminal, the communication terminal, or the vehicle communication device, the server generates, based on the received information and identification information for identifying the communication path of the software update used by the in-vehicle terminal, the communication terminal, or the vehicle communication device software to be distributed for distributing the information source as a communication target, which includes update information of the vehicle software or update information of the in-vehicle terminal software, a list of vehicle software to be updated or a list of in-vehicle terminal software to be updated as information which was excluded from the software to be distributed, and sending the generated software to be distributed, the generated list of vehicle software to be updated, or the generated list of in-vehicle terminal software to be updated to the in-vehicle terminal, the communication terminal, or the vehicle communication device, wherein the configuration information of the in-vehicle terminal software includes software version installed in the in-vehicle terminal, hardware configuration and model number of the in-vehicle terminal,
the in-vehicle terminal sends, upon starting the software update, at least one of the configuration information of the in-vehicle terminal software or the configuration information of the vehicle software to the server or the communication terminal by using a communication path of the software update, and,
upon receiving the update information of the in-vehicle terminal software from the server or the communication terminal, updates the in-vehicle terminal software based on the received update information of the in-vehicle terminal software, and wherein,
when the in-vehicle terminal uses the vehicle communication device that is connected to the vehicle control device and the in-vehicle terminal as the communication path of the software update, the vehicle control device transmits the configuration information of the in-vehicle terminal software or configuration information of the vehicle software to the sever via the vehicle communication device, and, upon receiving update information of the vehicle software from the vehicle communication device or the in-vehicle terminal, updates the vehicle software based on the received update information of the vehicle software.

12. The in-vehicle device according to claim 11, wherein, upon receiving the update information of the in-vehicle terminal software from the server via the communication terminal, the in-vehicle terminal updates the in-vehicle terminal software based on the received update information of the in-vehicle terminal software, and, upon receiving a list of vehicle software to be updated from the server via the communication terminal, requests the vehicle control device to start updating the vehicle software, and wherein
the vehicle control device sends the configuration information of the vehicle software to the server via the vehicle communication device in response to the request from the in-vehicle terminal, and, upon receiving update information of the vehicle software from the server via the vehicle communication device, updates the vehicle software based on the received update information of the vehicle software.

13. The in-vehicle device according to claim 11, wherein
the in-vehicle terminal sends the configuration information of the in-vehicle terminal software and the configuration information of the vehicle software to the server by using a wireless LAN, and, upon receiving update information of the in-vehicle terminal software from the server via the wireless LAN, updates the in-vehicle terminal software based on the received update information of the in-vehicle terminal software, and, upon receiving a list of vehicle software to be updated from the server via the wireless LAN, requests the vehicle control device to start updating the vehicle software, and wherein
the vehicle control device sends the configuration information of the vehicle software to the server via the vehicle communication device in response to the request from the in-vehicle terminal, and, upon receiving update information of the vehicle software from the server via the vehicle communication device, updates the vehicle software based on the received update information of the vehicle software.

14. The in-vehicle device according to claim 11, wherein
the in-vehicle terminal sends the configuration information of the in-vehicle terminal software and the configuration information of the vehicle software to the server by using the vehicle communication device, and, upon receiving update information of the vehicle information and a list of in-vehicle terminal software to be updated from the server via the vehicle communication device, requests the vehicle control device to start updating the vehicle software, changes a communication path of the software update from the vehicle communication device to the communication terminal, sends the configuration information of the in-vehicle terminal software to the server via the communication terminal, and, upon receiving update information of the in-vehicle terminal software from the server via the communication terminal, updates the in-vehicle terminal software based on the received update information of the in-vehicle terminal software, and wherein the vehicle control device acquires update information of the vehicle software from the in-vehicle terminal in response to the request from the in-vehicle terminal, and updates the vehicle software based on the acquired update information of the vehicle software.

15. The in-vehicle device according to claim 11, wherein the in-vehicle terminal sends the configuration information of the in-vehicle terminal software and the configuration information of the vehicle software to the server by using the communication terminal, and upon receiving update information of the in-vehicle terminal software and a list of vehicle software to be updated from the server via the communication terminal, updates the in-vehicle terminal software based on the received update information of the in-vehicle terminal software, changes a communication path of the software update from the communication terminal to a wireless LAN, sends the configuration information of the vehicle software to the server via the wireless LAN, and, upon receiving update information of the vehicle software from the server via the wireless LAN, requests the vehicle control device to start updating the vehicle software, and wherein the vehicle control device acquires update information of the vehicle software from the in-vehicle terminal in response to the request from the in-vehicle terminal, and updates the vehicle software based on the acquired update information of the vehicle software.

* * * * *